US012557723B2

(12) United States Patent
Okura et al.

(10) Patent No.: US 12,557,723 B2
(45) Date of Patent: Feb. 24, 2026

(54) WORK VEHICLE, CONTROL SYSTEM FOR WORK VEHICLE, AND CONTROL METHOD

(71) Applicant: KUBOTA CORPORATION, Osaka (JP)

(72) Inventors: Kohei Okura, Sakai (JP); Junichi Yuasa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 158 days.

(21) Appl. No.: 18/544,507

(22) Filed: Dec. 19, 2023

(65) Prior Publication Data

US 2024/0215473 A1 Jul. 4, 2024

(51) Int. Cl.
*A01B 69/04* (2006.01)
*B60Q 9/00* (2006.01)

(52) U.S. Cl.
CPC .............. *A01B 69/008* (2013.01); *B60Q 9/00* (2013.01)

(58) Field of Classification Search
None
See application file for complete search history.

(56) References Cited

U.S. PATENT DOCUMENTS

| | | | |
|---|---|---|---|
| 2002/0038182 A1* | 3/2002 | Wong ................. | B60R 25/1025 |
| | | | 701/472 |
| 2012/0215410 A1* | 8/2012 | McClure ................ | G01S 19/14 |
| | | | 701/50 |
| 2017/0153649 A1 | 6/2017 | Ogihara et al. | |
| 2018/0095476 A1* | 4/2018 | Madsen ............... | A01B 69/001 |
| 2018/0292212 A1 | 10/2018 | Bobye | |
| 2019/0277880 A1* | 9/2019 | Kinoshita ............... | G01S 19/47 |
| 2021/0095965 A1 | 4/2021 | Zhao et al. | |
| 2022/0107427 A1* | 4/2022 | Kleeman .................. | G06N 7/01 |
| 2023/0200281 A1* | 6/2023 | Dix ........................ | B60K 35/65 |
| | | | 701/41 |

* cited by examiner

*Primary Examiner* — Tamara L Weber

(74) *Attorney, Agent, or Firm* — Keating & Bennett, LLP

(57) ABSTRACT

A work vehicle includes a positioning system to output first chronological data, an inertial measurement system to output second chronological data based on measurement values from an acceleration sensor and an angular velocity sensor, and a controller to, in a first state when positioning by the positioning system is possible, consecutively estimate a first azimuth angle based on the first and second chronological data, consecutively estimate a second azimuth angle based on the second chronological data, calculate a rate of change in azimuth error of the second azimuth angle based on a difference between the consecutively-estimated first and second azimuth angles in the first state, and, in a second state associated with a decreased reliability of positioning, perform steering control based on an azimuth angle resulting from causing the second azimuth angle estimated based on the second chronological data to be corrected based on the rate of change in azimuth error.

13 Claims, 13 Drawing Sheets

WORK VEHICLE, CONTROL SYSTEM FOR WORK VEHICLE, AND CONTROL METHOD

CROSS-REFERENCE TO RELATED APPLICATION

This application claims priority to Japanese Patent Application No. 2022-211142, which was filed on Dec. 28, 2022, the entire contents of which are hereby incorporated by reference.

BACKGROUND OF THE INVENTION

1. Field of the Invention

The present disclosure relates to work vehicles, control systems for work vehicles, and control methods.

2. Description of the Related Art

Research and development has been directed to the automation of work vehicles, such as tractors, to be used in fields. For example, work vehicles have been put to practical use which travel via automatic steering by utilizing a positioning system capable of precise positioning, e.g., GNSS (Global Navigation Satellite System). Work vehicles that automatically perform speed control as well as automatic steering have also been put to practical use.

The specification of U.S. Patent Application Publication No. 2018/0292212 discloses a GNSS/INS navigation system that performs positioning of a vehicle by combining a GNSS and an IMU (Inertial Measurement Unit). In situations where GNSS signals are not available, this system is able to operate in a dead reckoning mode in which positioning is performed based on signals from the IMU. The specification of U.S. Patent Application Publication No. 2018/0292212 discloses correction of drift errors in measured values of rotation around the z axis (yaw axis) of a vehicle during dead reckoning operation.

In connection with a positioning system that includes a GNSS and an INS (Inertial Navigation System), the specification of U.S. Patent Application Publication No. 2021/0095965 discloses using a previously-trained neural network prediction model to predict an error in the GNSS output and to correct the INS output, in a situation where GNSS signal are not adequately available.

SUMMARY OF THE INVENTION

A work vehicle that travels via automatic steering performs a steering control along a target path while performing localization, i.e., estimating its own position and direction. Localization is performed based on outputs from various sensors, e.g., GNSS and IMU, for example. An environment that is traveled by a work vehicle may include obstacles which hinder reception of GNSS signals. For example, trees (e.g., shelter woods) may exist in the environment to be traveled, thus lowering the reliability of positioning based on GNSS signals. In that case, "dead reckoning" may be performed, that is, the results of positioning may be complemented by utilizing signals from an IMU. However, an azimuth angle that is estimated based on signals from an IMU may have the problem of accumulated drift errors with lapse of time. It is desired to reduce errors associated with drifts in the azimuth angle that is estimated during dead reckoning operation.

Example embodiments of the present invention provide systems and methods for reducing estimation errors in an azimuth angle during dead reckoning operation.

A work vehicle according to an illustrative example embodiment of the present disclosure is capable of performing auto-steer driving. The work vehicle includes a positioning system to output first chronological data including positional information of the work vehicle, an inertial measurement system, including an acceleration sensor and an angular velocity sensor, to output second chronological data based on measurement values from the acceleration sensor and measurement values from the angular velocity sensor, and a controller configured or programmed to estimate a position and an azimuth angle of the work vehicle based on the first chronological data and the second chronological data, and to perform steering control for the work vehicle based on the estimated position and azimuth angle and on a target path that is previously set, wherein the controller is configured or programmed to, in a first state where positioning by the positioning system is possible, consecutively estimate a first azimuth angle of the work vehicle based on the first chronological data and the second chronological data, consecutively estimate a second azimuth angle of the work vehicle based on the second chronological data, and to perform steering control for the work vehicle based on the first azimuth angle, calculate a rate of change in azimuth error of the second azimuth angle based on a difference between the consecutively-estimated first azimuth angle and the consecutively-estimated second azimuth angle in the first state, and when the first state transitions to a second state that is associated with a decreased reliability of positioning by the positioning system, perform steering control for the work vehicle until returning to the first state, based on an azimuth angle that is a result of causing the second azimuth angle as estimated based on the second chronological data to be corrected based on the rate of change in azimuth error.

General or specific aspects of various example embodiments of the present disclosure may be implemented using a device, a system, a method, an integrated circuit, a computer program, a non-transitory computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be included within a single apparatus, or divided over two or more separate apparatuses.

According to example embodiments of the present disclosure, estimation errors in an azimuth angle during dead reckoning operation are capable of being reduced.

The above and other elements, features, steps, characteristics and advantages of the present invention will become more apparent from the following detailed description of the example embodiments with reference to the attached drawings.

BRIEF DESCRIPTION OF THE DRAWINGS

FIGS. 6A to 6C are diagrams showing examples of travel of the work vehicle in an automatic steering mode.

FIG. 7 is a diagram schematically showing an example of a target path of the work vehicle traveling in a field via automatic steering.

DETAILED DESCRIPTION OF THE EXAMPLE EMBODIMENTS

Figure 1:
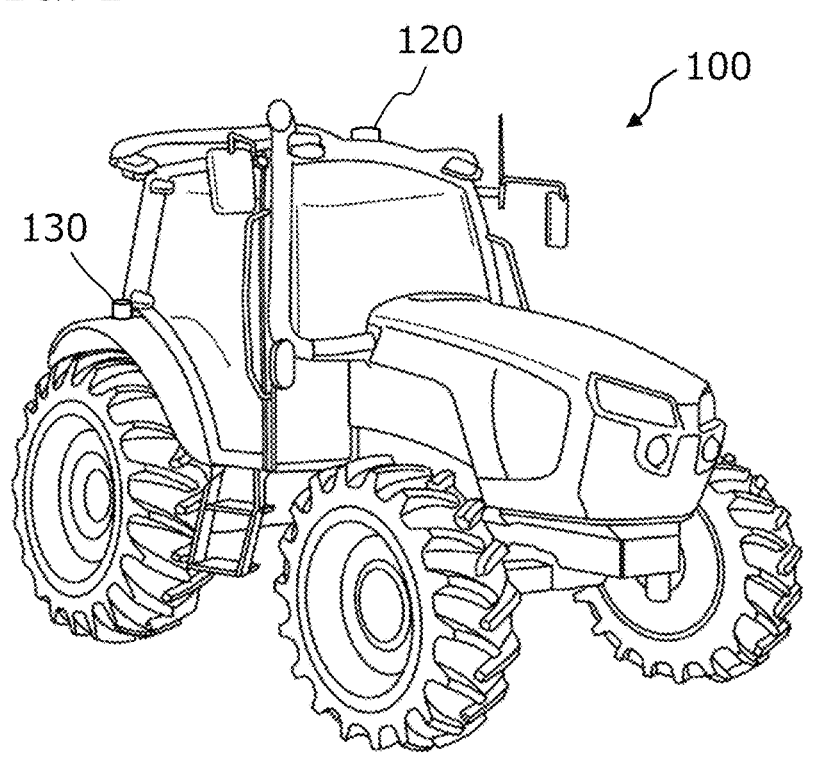
FIG. 1 is a perspective view showing an example appearance of a work vehicle according to Example Embodiment 1 of the present invention.

Hereinafter, example embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

The following example embodiments are only exemplary, and the techniques according to example embodiments of the present disclosure are not limited to the following example embodiments. For example, numerical values, shapes, steps, and orders of steps, layout of a display screen, etc., that are indicated in the following example embodiments are only exemplary, and admit of various modifications so long as it makes technological sense. Any one implementation may be combined with another so long as it makes technological sense to do so.

Hereinafter, example embodiments will be described in which the techniques of the present disclosure are applied to a tractor for agricultural use, as an example work vehicle. The techniques of example embodiments of the present disclosure are applicable to not only a tractor but also any work vehicle that is capable of traveling by automatic steering. The work vehicle may be a rice transplanter, a combine, a mower, a harvester, a snowplow vehicle, or a construction vehicle, for example.

Work vehicles and control systems for work vehicles according to illustrative example embodiments of the present disclosure will be described.

A work vehicle according to the present example embodiment includes a control system to perform control to achieve auto-steer driving. The control system may be a computer system that includes a storage device and a controller. The storage device includes one or more storage media to store various data, such as a target path for the work vehicle. The controller may include one or more computers, processors, or control circuits to control the operation of the work vehicle. The controller is configured or programmed to be capable of operating in both of an automatic steering mode and a manual steering mode. The controller is configured or programmed to switch between the automatic steering mode and the manual steering mode in response to a driver's manipulation, for example. In the automatic steering mode, the controller is configured or programmed to control steering of the work vehicle so that the work vehicle travels along a target path based on the position of the work vehicle as identified by the positioning system and the target path as stored in the storage device. The positioning system is disposed inside or outside the work vehicle. The positioning system, which includes e.g., a GNSS receiver, identifies the position of the work vehicle based on signals from a plurality of GNSS satellites, and outputs position data in chronological order. The positioning system may include any device other than a GNSS receiver, e.g., a LiDAR sensor (s) or a camera (s). Through matching between data that is acquired by the LiDAR sensor (s) or camera (s) and an environment map that is prepared in advance, the position of the work vehicle can be estimated. The target path is a path to serve as a target of traveling that is set within an area to be travelled by the work vehicle. The target path is set before beginning auto-steer driving, and is recorded in the storage device. The target path may be set within a field, for example.

A work vehicle according to the present example embodiment includes a positioning system, an inertial measurement system, and a controller. The positioning system outputs first chronological data including positional information of the work vehicle. The inertial measurement system includes an acceleration sensor and an angular velocity sensor, and outputs second chronological data based on measurement values from the acceleration sensor and measurement values from the angular velocity sensor. Based on the first chronological data and the second chronological data, the controller is configured or programmed to estimate a position and an azimuth angle of the work vehicle, and perform steering control for the work vehicle based on the estimated position and azimuth angle and on a target path that is previously set. The controller is configured or programmed to perform operations (1) to (3) below.

(1) In a first state where positioning by the positioning system is possible, an azimuth angle of the work vehicle (hereinafter also referred to as "first azimuth angle") is consecutively estimated based on the first chronological data and the second chronological data; an azimuth angle of the work vehicle (hereinafter also referred to as "second azimuth angle") is consecutively estimated based on the second chronological data; and steering control for the work vehicle is performed based on the first azimuth angle.

(2) Based on a difference between the first azimuth angle and the second azimuth angle consecutively estimated in the first state, a rate of change in azimuth error of the second azimuth angle is calculated.

(3) When the first state transitions to a second state that is associated with a decreased reliability of positioning by the positioning system, steering control for the work vehicle is performed until returning to the first state, based on an azimuth angle that is a result of causing the second azimuth angle as estimated based on the second chronological data to be corrected based on the rate of change in azimuth error.

The positioning system includes a GNSS receiver, for example. The inertial measurement system may be an IMU, or a combination of an acceleration sensor and an angular velocity sensor which were separately provided, for example.

In the first state, through a process utilizing an extended Kalman filter, for example, the controller can estimate the position and first azimuth angle of the work vehicle from the first chronological data and the second chronological data. Moreover, through a process such as integrating measurement values of angular velocity included in the second chronological data, the controller can estimate the second azimuth angle. Herein, an azimuth angle refers to a yaw angle, which is an angle of rotation around an axis of the work vehicle in the top-bottom direction.

The first state is a state where no obstacles that may hinder reception of GNSS signals exist around the work vehicle and thus positioning based on GNSS signals can be performed with a high reliability. The second state is a state where obstacles, etc., that hinder reception of GNSS signals exist around the work vehicle, thus resulting in a low reliability of positioning based on GNSS signals or an inability to perform positioning. In an environment traveled by an agricultural work vehicle, obstacles that hinder reception of GNSS signals may exist. For example, shelter woods may exist at the outer periphery of a field, so that, when the work vehicle turns near the shelter woods, reception of the GNSS signals may be hindered to lower the reliability of localization. In such cases, the controller performs a dead reckoning operation, which involves localization by utilizing signals from the inertial measurement system.

During dead reckoning operation, the direction of the work vehicle may be calculated by integrating the angular velocity measured by the angular velocity sensor. The direction is specified in terms of yaw angles. Since the yaw angle cannot be corrected based on a gradient relative to the direction of gravity that is ascertained from measurement values from the acceleration sensor, errors in angular velocity in the yaw direction will accumulate. These errors are referred to as "drift errors". Drift errors occur depending on the environment, i.e., the properties of elements within the inertial measurement system, temperature, or the like.

In the present example embodiment, in order to compensate for drift errors, the controller calculates a rate of change in azimuth error of the second azimuth angle based on a difference between the first azimuth angle and the second azimuth angle consecutively estimated in the first state, where positioning by the positioning system is possible. Based on a rate of temporal change in difference between the first azimuth angle and the second azimuth angle in the first state, the controller calculates a rate of change in azimuth error. In a second state that is associated with a decreased reliability of positioning by the positioning system, the controller performs steering control for the work vehicle based on an azimuth angle that is a result of causing the second azimuth angle as estimated based on the second chronological data to be corrected based on the rate of change in azimuth error. Through such operation, a decrease in reliability of localization associated with drifts of the azimuth angle (yaw angle) can be suppressed, thereby stabilizing the automatic steering during dead reckoning.

Hereinafter, the configuration and operation of a work vehicle according to the present example embodiment will be described in more detail.

Figure 2:
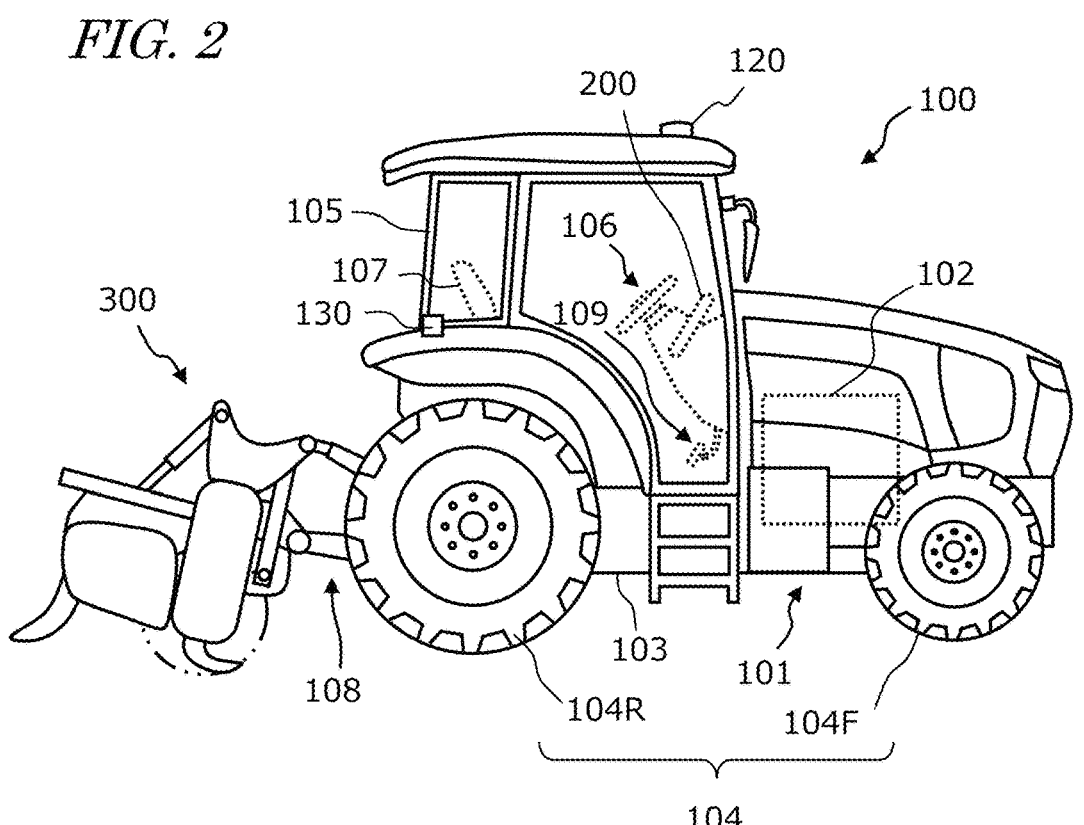
FIG. 2 is a side view schematically showing the work vehicle and an example of an implement that is linked to the work vehicle.

FIG. 1 is a perspective view showing an example appearance of a work vehicle 100 according to the present example embodiment. FIG. 2 is a side view schematically showing the work vehicle 100 and an example of an implement 300 that is linked to the work vehicle 100. The work vehicle according to the present example embodiment is a tractor for use in a field, for example. The techniques according to the present example embodiment are also applicable to work vehicles other than tractors.

The work vehicle 100 according to the present example embodiment includes a positioning system 120 and one or more obstacle sensors 130. Although FIG. 1 illustrates one obstacle sensor 130, obstacle sensors 130 may be provided at a plurality of positions of the work vehicle 100. The obstacle sensor (s) 130 is to be provided as necessary. If not needed, no obstacle sensors 130 may be provided in the work vehicle 100.

As shown in FIG. 2, the work vehicle 100 includes a vehicle body 101 a prime mover (engine) 102, and a transmission 103. On the vehicle body 101, wheels 104 (e.g., tires) and a cabin 105 are provided. The wheels 104 include a pair of front wheels 104F and a pair of rear wheels 104R. Inside the cabin 105, a driver's seat 107, a steering device 106, a plurality of pedals 109, an operational terminal 200, and switches for manipulation are provided. Either one or both of each front wheel 104F and each rear wheel 104R may be replaced by a plurality of wheels on which a track is worn (i.e., a crawler), rather than tires.

The positioning system 120 in the present example embodiment includes a GNSS receiver. The GNSS receiver may include an antenna to receive a signal (s) from a GNSS satellite (s) and a processor to determine the position of the work vehicle 100 based on the signal (s) received by the antenna. The positioning system 120 receive GNSS signals transmitted from a plurality of GNSS satellites, and performs positioning based on the GNSS signals. GNSS is a general term for satellite positioning systems, such as GPS (Global Positioning System), QZSS (Quasi-Zenith Satellite System, e.g., MICHIBIKI), GLONASS, Galileo, BeiDou, and the like. Although the positioning system 120 in the present example embodiment is disposed above the cabin 105, it may be disposed at any other position.

Instead of or in addition to the GNSS receiver, the positioning system 120 may include any other type of device, such as a LiDAR sensor (s) or a camera (s) (including an image sensor). When objects serving as characteristic points exist in the environment that is traveled by the work vehicle 100, the position of the work vehicle 100 can be estimated with a high accuracy based on data that is acquired with the LiDAR sensor (s) or camera (s) and an environment map that is previously recorded in a storage device 170. The LiDAR sensor (s) or camera (s) may be used together with the GNSS receiver. By correcting or complementing position data based on the GNSS signal (s) using the data acquired by the LiDAR sensor (s) 110 or camera (s), it becomes possible to identify the position of the work vehicle 100 with a higher accuracy.

In the examples shown in FIGS. 1 and 2, the obstacle sensor (s) 130 is provided at the rear of the vehicle body 101. The obstacle sensor (s) 130 may be disposed at any other position than the rear of the vehicle body 101. For example, one or more obstacle sensors 130 may be disposed at any position selected from among the sides of the vehicle body 101, the front of the vehicle body 101, and the cabin 105. The obstacle sensor (s) 130 detects objects around the work vehicle 100. Each obstacle sensor 130 may include a laser scanner or an ultrasonic sonar, for example. When an object exists at a position closer to the obstacle sensor (s) 130 than a predetermined distance, the obstacle sensor (s) 130 outputs a signal indicating the presence of an obstacle. A plurality of obstacle sensors 130 may be provided at different positions of the body of the work vehicle 100. For example, a plurality of laser scanners and a plurality of ultrasonic sonars may be disposed at different positions of the body. Providing a multitude of obstacle sensors 130 can reduce blind spots in monitoring obstacles around the work vehicle 100. As aforementioned, the work vehicle 100 does not need to include the obstacle sensor (s) 130.

The prime mover 102 may be a diesel engine, for example. Instead of a diesel engine, an electric motor may be used. The transmission 103 can change the propulsion and moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force to change the steering angle of the front wheels 104F. When automatic steering is performed, under the control of a controller disposed in the work vehicle 100, the steering angle may be automatically adjusted by the power of the hydraulic device or electric motor.

The plurality of pedals 109 include an accelerator pedal, a clutch pedal, and a brake pedal. On each pedal, a sensor to detect stepping or force is provided.

A linkage device 108 is provided at the rear of the vehicle body 110. The linkage device 108 may include, e.g., a three-point linkage (also referred to as a "three-point link" or a "three-point hitch"), a PTO (Power Take Off) shaft, a universal joint, and a communication cable. The linkage device 108 allows the implement 300 to be attached to or detached from the work vehicle 100. The linkage device 108 is able to raise or lower the three-point linkage device with a hydraulic device, for example, thus controlling the position or pose of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 110. In that case, the implement may be connected frontward of the work vehicle 100.

Although the implement 300 shown in FIG. 2 is a rotary tiller, the implement 300 is not limited to a rotary tiller. For example, any arbitrary implement such as a mower, a seeder, a spreader, a transplanter, a rake implement, a baler, a harvester, a sprayer, or a harrow, may be connected to the work vehicle 100 for use.

Figure 3:
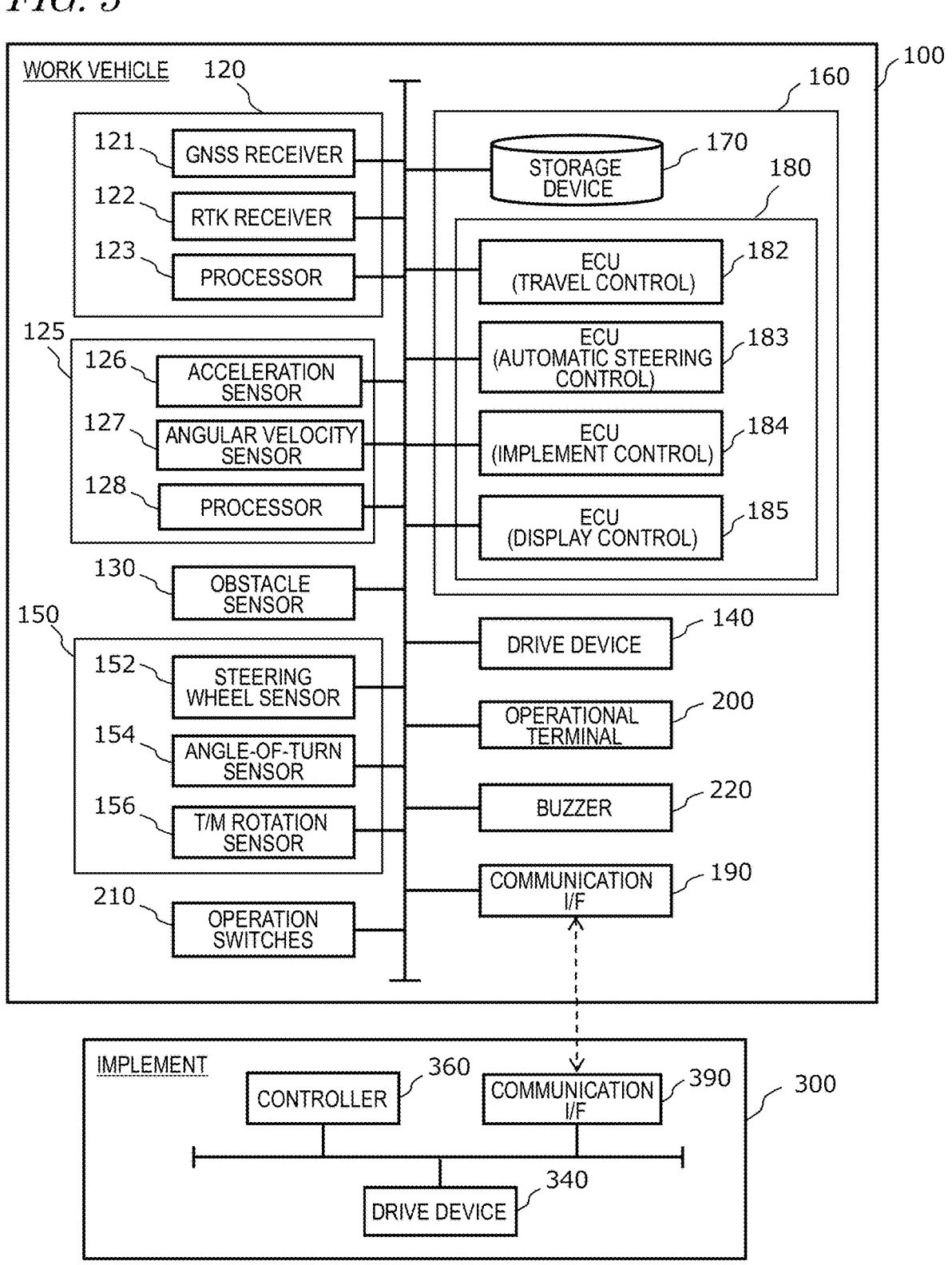
FIG. 3 is a block diagram showing an example of a schematic configuration of the work vehicle and the implement.

FIG. 3 is a block diagram showing an example of a schematic configuration of the work vehicle 100 and the implement 300. The work vehicle 100 and the implement 300 can communicate with each other via a communication cable that is included in the linkage device 108.

In addition to the positioning system 120, the obstacle sensor (s) 130, and the operational terminal 200, the work vehicle 100 in the example of FIG. 3 includes an inertial measurement system 125, a drive device 140, sensors 150, a control system 160, a communication interface (I/F) 190, operation switches 210, and a buzzer 220. These component elements are connected to one another so as to be capable of communication via buses.

The positioning system 120 includes a GNSS receiver 121, an RTK receiver 122, and a processor 123. The inertial measurement system 125 includes an acceleration sensor 126, an angular velocity sensor 127, and a processor 128. The sensors 150 may include a steering wheel sensor 152, an angle-of-turn sensor 154, and a transmission (T/M) rotation sensor 156, for example. The control system 160 includes the storage device 170 and a controller 180. The controller 180 includes a plurality of electronic control units (ECU) 182, 183, 184 and 185. The implement 300 includes a drive device 340, a controller 380, and a communication interface (I/F) 390. Note that FIG. 3 shows component elements which are relatively closely related to the operation of automatic steering or self-driving by the work vehicle 100, while other component elements are omitted from illustration.

The GNSS receiver 121 in the positioning system 120 receives satellite signals that are transmitted from a plurality of GNSS satellites (which may also be referred to as "GNSS signals"), and generates GNSS data based on the satellite signals. The GNSS data is generated in a predetermined format such as NMEA-0183 format, for example. The GNSS data may include values indicating an ID number, an angle of elevation, an azimuth angle, and a reception intensity of each satellite from which the satellite signal was received, for example. Reception intensity may be expressed by a value such as carrier to noise density ratio (C/NO), for example. GNSS data may include positional information of the work vehicle 100 as calculated based on a plurality of received satellite signals and information indicating the reliability of that positional information. The positional information may be expressed in terms of latitude, longitude, height from the mean sea level, for example. The reliability of positional information may be expressed in terms of a DOP value that indicates how the satellites are being deployed, for example.

Figure 4:
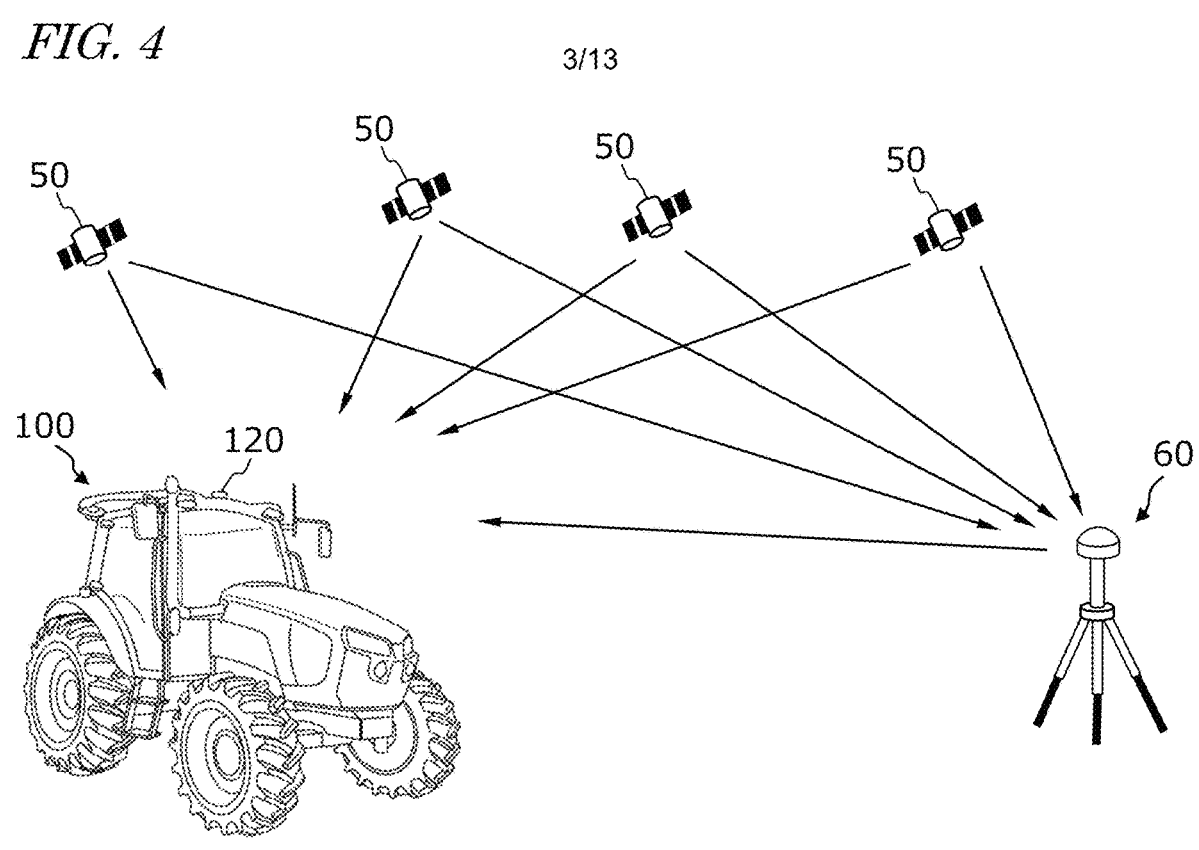
FIG. 4 is a conceptual diagram showing an example of the work vehicle which performs positioning based on an RTK-GNSS.

The positioning system 120 shown in FIG. 3 performs positioning of the work vehicle 100 by utilizing an RTK (Real Time Kinematic)-GNSS. FIG. 4 is a conceptual diagram showing an example of the work vehicle 100 which performs positioning based on an RTK-GNSS. In the positioning based on an RTK-GNSS, not only satellite signals transmitted from a plurality of GNSS satellites 50, but also a correction signal that is transmitted from a reference station 60 is used. The reference station 60 may be disposed near the field in which the work vehicle 100 performs tasked travel (e.g., at a position within about 10 km of the work vehicle 100). The reference station 60 generates a correction signal of e.g., an RTCM format based on the satellite signals received from the plurality of GNSS satellites 50, and transmits the correction signal to the positioning system 120. The RTK receiver 122, which includes an antenna and a modem, receives the correction signal transmitted from the reference station 60. Based on the correction signal, the processor 123 of the positioning system 120 corrects the result of positioning by the GNSS receiver 121. Use of an RTK-GNSS enables positioning with an accuracy on the order of several cm of errors, for example. Positional information (including latitude, longitude, and altitude information) is acquired through the highly accurate positioning by an RTK-GNSS. The processor 123 of the positioning system 120 may calculate the position of the work vehicle 100 as frequently as, e.g., one to ten times per second. The positioning system 120 outputs first chronological data including information of the calculated position (coordinates).

Note that the positioning method is not limited to an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the positioning system 120 may lack the RTK receiver 122.

The inertial measurement system 125 is an IMU, for example. Alternatively, the inertial measurement system 125 may be a combination of an acceleration sensor 126 and an angular velocity sensor 127 which are separately provided. The acceleration sensor 126 may be a 3-axis accelerometer, for example. The angular velocity sensor 127 may be a 3-axis gyroscope, for example. By performing processes such as integrating measurement values from the acceleration sensor 126 and measurement values from the angular velocity sensor 127 over time, the processor 128 is able to output second chronological data that includes information of the position and direction of the work vehicle 100. Instead of performing the above process, the processor 128 may perform necessary correction processes for the measurement values from the acceleration sensor 126 and the measurement values from the angular velocity sensor 127 to output data including information of the corrected acceleration and angular velocity and the point in time of measurement, this data serving as second chronological data. Note that the inertial measurement system 125 may include a direction sensor such as a 3-axis geomagnetic sensor. The inertial measurement system 125 functions as a motion sensor which can output signals representing parameters such as acceleration, velocity, displacement, and pose of the work vehicle 100. The inertial measurement system 125 is able to output such signals as frequently as several tens to several thousands of times per second.

The positioning system 120 and the inertial measurement system 125 may be integrated into a single device. The processes to be performed by the processors 123 and 128 may be performed by a single processor. At least a portion of the processes to be performed by the processors 123 and 128 may be performed by a processor that is included in the controller 180. Based not only on the GNSS signals and the correction signal but also on a signal that is output from the inertial measurement system 125, such a processor can estimate the position and orientation of the work vehicle 100 with a higher accuracy. The signal that is output from the inertial measurement system 125 may be used for the correction or complementation of the position that is calculated based on the GNSS signals and the correction signal. The inertial measurement system 125 can output a signal more frequently than the GNSS signals. Utilizing this highly frequent signal allows the position and orientation of the work vehicle 100 to be measured more frequently (e.g., about 10 Hz or above).

Instead of or in addition to the GNSS receiver 121 and the RTK receiver 122, the positioning system 120 may include other types of sensors, such as a LiDAR sensor (s) or an image sensor (s). If any object exists in the environment traveled by the work vehicle 100 that may serve as a landmark, the position and orientation of the work vehicle 100 can be estimated through matching between the sensor data that is output from such a sensor (s) and an environment map. In such a configuration, an external sensor (s) such as the LiDAR sensor (s) or image sensor (s) may be included in the positioning system.

For example, the drive device 140 may include various devices that are needed for the traveling of the work vehicle 100 and the driving of the implement 300, e.g., the aforementioned prime mover 102, transmission 103, steering device 106, and linkage device 108. The prime mover 102 may include an internal combustion engine such as a diesel engine. Instead of an internal combustion engine or in addition to an internal combustion engine, the drive device 140 may include an electric motor that is dedicated to traction purposes.

The steering wheel sensor 152 measures the angle of rotation of the steering wheel of the work vehicle 100. The angle-of-turn sensor 154 measures the angle of turn of the front wheels 104F, which are the wheels responsible for steering.

The T/M rotation sensor 156 is a sensor to measure the rotational speed, i.e., the number of revolutions per unit time, of a wheel axis that is connected to a wheel 104. The T/M rotation sensor 156 may be a sensor utilizing a magnetoresistive element (MR), a Hall generator, or an electromagnetic pickup, for example. The T/M rotation sensor 156 may output a pulse signal that is in proportion to the rotational speed of a gear that is included in the transmission, for example. The T/M rotation sensor 156 is used to determine the vehicle speed and traveling direction of the work vehicle 100.

Measurement values by the steering wheel sensor 152, the angle-of-turn sensor 154, and the T/M rotation sensor 156 are used for the steering control by the controller 180.

The storage device 170 includes one or more storage media such as a flash memory or a magnetic disc. The storage device 170 stores various data that is generated by the sensors and the controller 180. The data that is stored by the storage device 170 may include map data in the environment that is traveled by the work vehicle 100, and data of a target path of automatic steering. The storage device 170 also stores a computer program (s) to cause the ECUs in the controller 180 to perform various operations to be described later. Such a computer program (s) may be provided for the work vehicle 100 via a storage medium (e.g., a semiconductor memory or an optical disc) or through telecommunication lines (e.g., the Internet). Such a computer program(s) may be marketed as commercial software.

The controller 180 includes a plurality of ECUs. The plurality of ECUs include an ECU 182 for travel control, an ECU 183 for automatic steering control, an ECU 184 for implement control, and an ECU 185 for display control. The ECU 182 controls the prime mover 102, the transmission 103, the accelerator, and the brakes included in the drive device 140, thus controlling the speed of the work vehicle 100. The ECU 182 controls the hydraulic device or electric motor included in the steering device 106 based on a measurement value from the steering wheel sensor 152, thus controlling the steering of the work vehicle 100. The ECU 183 performs computations and controls to achieve auto-steer driving, based on signals which are output from the positioning system 120, the inertial measurement system 125, the steering wheel sensor 152, the angle-of-turn sensor 154, the T/M rotation sensor 156, and the like. During auto-steer driving, the ECU 183 sends the ECU 182 a command to change the steering angle. In response to this command, the ECU 182 controls the steering device 106 to change the steering angle. In order to cause the implement 300 to perform a desired operation, the ECU 184 controls the operation of the linkage device 108. Also, the ECU 184 generates a signal to control the operation of the implement 300, and transmits this signal from the communication I/F 190 to the implement 300. The ECU 185 controls displaying on the operational terminal 200. For example, the ECU 185 may cause a display device of the operational terminal 200 to present various indications, e.g., a map of the field, the position of the work vehicle 100 and a target path in the map, pop-up notifications, and setting screens.

Through the action of these ECUs, the controller 180 realizes driving via manual steering or automatic steering. During auto-steer driving, the controller 180 controls the drive device 140 based on the position and the direction of the work vehicle 100 as measured or estimated by the positioning system 120 and the inertial measurement system 125 and the target path stored in the storage device 170. As a result, the controller 180 can cause the work vehicle 100 to travel along the target path. Note that the controller 180 may automatically control not only the steering but also the vehicle speed of the work vehicle 100. In other words, the controller 180 may be configured or programmed to operate in a self-driving mode of causing the work vehicle 100 to automatically travel along a target path that is previously set.

The plurality of ECUs included in the controller 180 may communicate with one another according to a vehicle bus standard such as CAN (Controller Area Network). Although the ECUs 182, 183, 184 and 185 are illustrated as individual corresponding blocks in FIG. 3, each of these functions may be implemented by a plurality of ECUs. Alternatively, an onboard computer that integrates the functions of at least some of the ECUs 182, 183, 184 and 185 may be provided. The controller 180 may include ECUs other than the ECUs 182, 183, 184 and 185. Any number of ECUs may be provided in accordance with functionality. Each ECU includes a control circuit including one or more processors.

The communication I/F 190 is a circuit that performs communications with the communication I/F 390 of the implement 300. The communication I/F 190 performs exchanges of signals complying with an ISOBUS standard such as ISOBUS-TIM, for example, between itself and the communication I/F 390 of the implement 300. This causes the implement 300 to perform a desired operation, or allows information to be acquired from the implement 300. Moreover, the communication I/F 190 can communicate with an external computer via a wired or wireless network. The external computer may be a server computer in a farming support system which centralizes management of information concerning fields by using a cloud, and assists in agriculture by utilizing the data on the cloud, for example.

The operational terminal 200 is a terminal for the user to perform a manipulation related to the traveling of the work vehicle 100 and the operation of the implement 300, and may also be referred to as a virtual terminal (VT). The operational terminal 200 may include a display device such as a touch screen panel, and/or one or more buttons. By manipulating the operational terminal 200, the user can perform various manipulations, such as switching ON/OFF the automatic steering mode, setting an initial position of the work vehicle 100, setting a target path, recording or editing a map, and switching ON/OFF the implement 300. At least some of these manipulations can also be realized by manipulating the operation switches 210. Displaying on the operational terminal 200 is controlled by the ECU 185.

The buzzer 220 is an audio output device to present an alarm sound to alert the user of an abnormality. For example, during auto-steer driving, the buzzer 220 may present an alarm sound when the work vehicle 100 has veered away from the target path by a predetermined distance or more. Instead of the buzzer 220, a loudspeaker of the operational terminal 200 may provide a similar function.

The drive device 340 in the implement 300 performs a necessary operation for the implement 300 to perform a predetermined task. The drive device 340 includes devices adapted to the intended use of the implement 300, e.g., a pump, a hydraulic device, an electric motor, or a pump. The controller 380 controls the operation of the drive device 340. In response to a signal that is transmitted from the work vehicle 100 via the communication IF 390, the controller 380 causes the drive device 340 to perform various operations. Moreover, a signal that is in accordance with the state of the implement 300 may be transmitted from the communication I/F 390 to the work vehicle 100.

Figure 5:
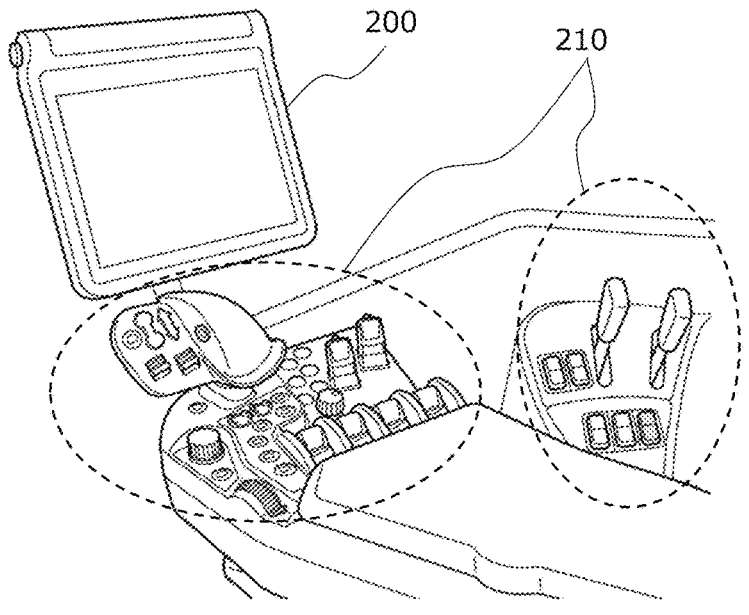
FIG. 5 is a diagram showing an example of an operational terminal and operation switches to be provided in a cabin.

FIG. 5 is a diagram showing an example of the operational terminal 200 and operation switches 210 to be provided in the cabin 105. In the cabin 105, switches 210, including a multitude of switches that are manipulable to the user, are disposed. The switches 210 may include, for example, a switch to switch between automatic steering mode and manual steering, a switch to switch between forward travel and backward travel (e.g., a shuttle lever or a shuttle switch), a switch to select the gear shift as to a main gear shift or a range gear shift, and a switch to raise or lower the implement 300.

Next, the operation of the work vehicle 100 will be described. The controller 180 in the present example embodiment is able to switch between a manual steering mode and an automatic steering mode in response to a manipulation by a user (e.g., a driver) of the work vehicle 100. In the manual steering mode, the controller 180 controls steering by driving the power steering device in response to the user's manipulation of the steering wheel. In the automatic steering mode, the controller 180 controls steering by driving the power steering device based on the position and the orientation (direction) of the work vehicle 100 as estimated based on the data that is output from the positioning system 120 and the inertial measurement system 125 and a previously-recorded target path. In the automatic steering mode, too, speed of the vehicle is adjustable through accelerating operations and braking operations by the user.

Figure 6A:
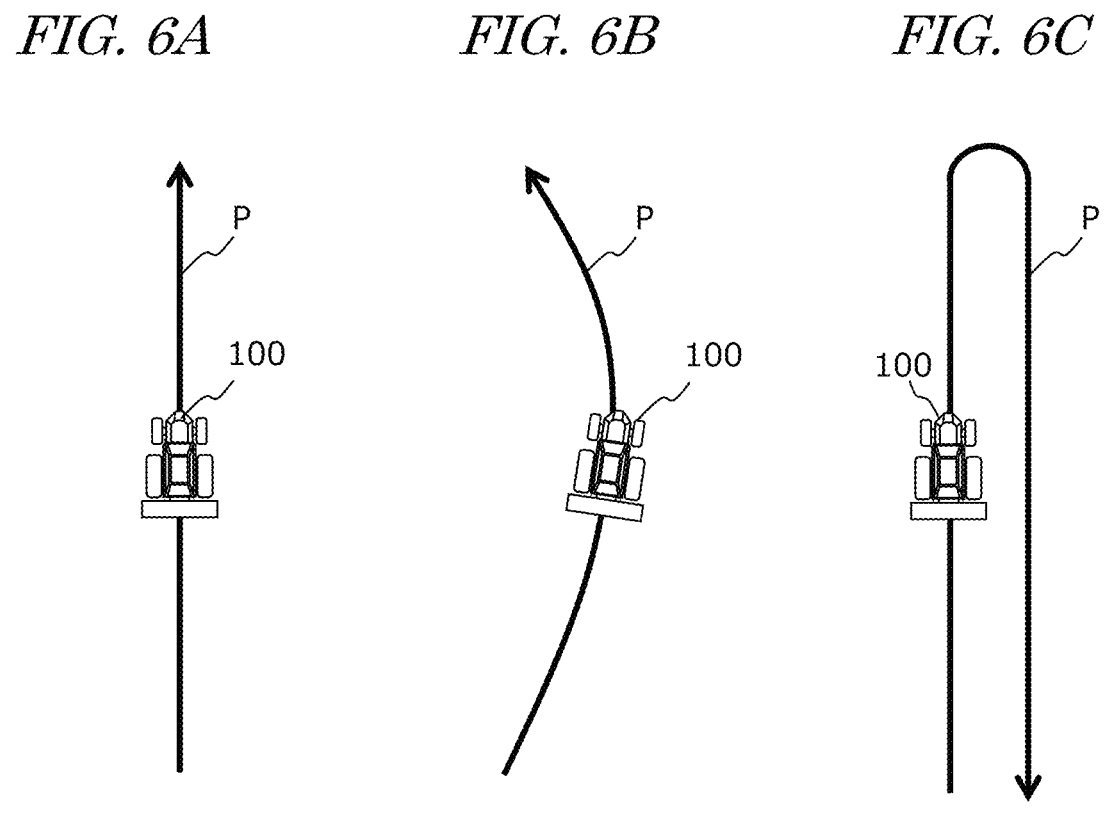

FIGS. 6A to 6C are diagrams showing examples of travel by the work vehicle 100 in the automatic steering mode. FIG. 6A schematically shows how the work vehicle 100 may travel along a linear target path P. FIG. 6B schematically shows how the work vehicle 100 may travel along a curved target path P. FIG. 6C schematically shows how the work vehicle 100 may travel along a target path P that includes two adjacent linear paths and a curved path interconnecting them. The target path P is previously set, and is recorded in the storage device 170. When the work vehicle 100 is traveling in the automatic steering mode, the controller 180 repeats an operation of calculating a deviation (or difference) between the position and orientation of the work vehicle 100 as estimated based on the data that is output from the positioning system 120 and the inertial measurement system 125 and the target path P and controlling the steering device so as to reduce this deviation. This causes the work vehicle 100 to travel along the target path P.

Figure 7:
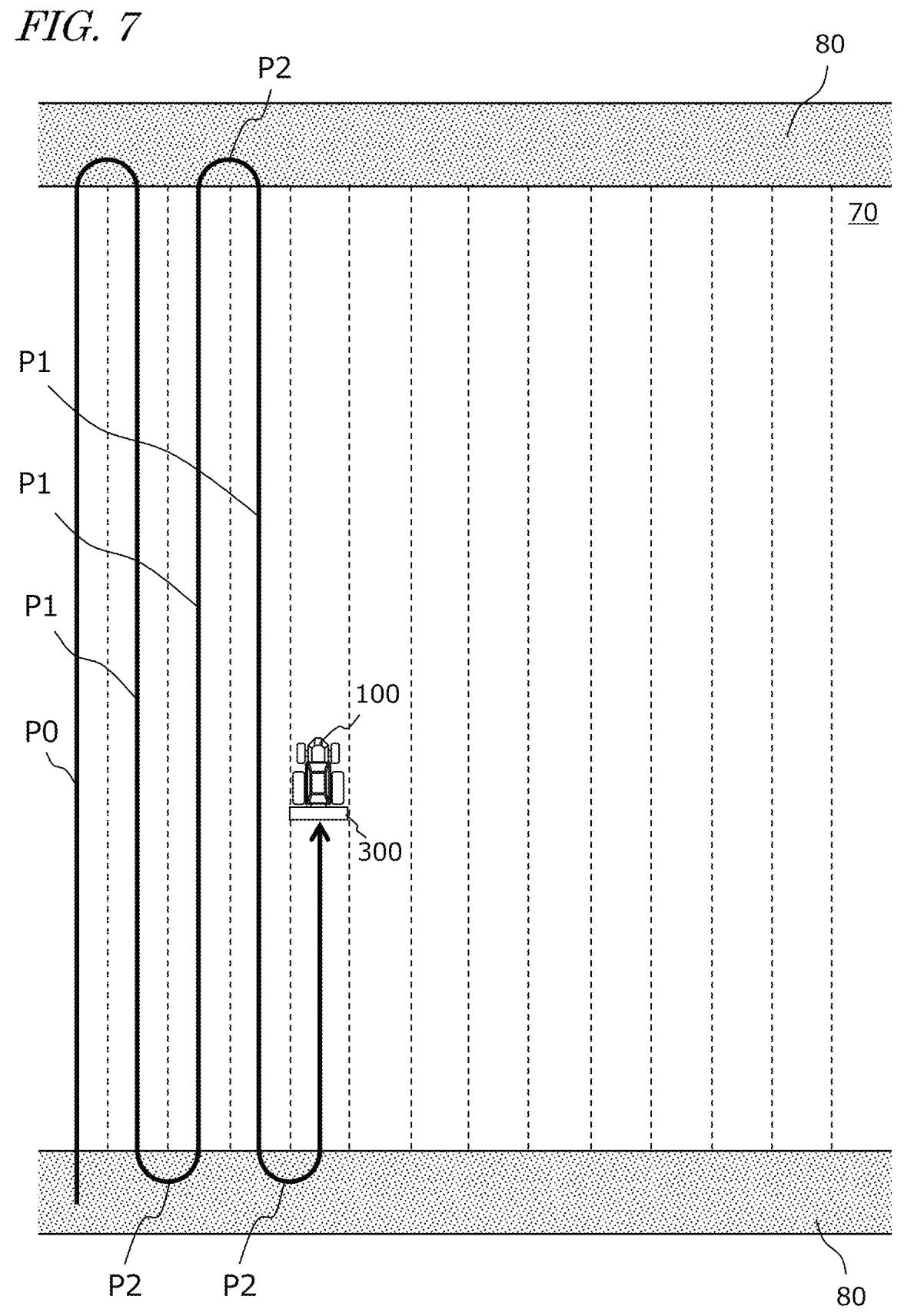

FIG. 7 is a diagram schematically showing an example of a target path of the work vehicle 100 traveling in the field via automatic steering. In this example, the field includes a work area 70 in which the work vehicle 100 and the implement 300 perform a task, and headlands 80 that are located near the outer peripheral edge of the field. Through a manipulation of the operational terminal 200, the user may designate which regions on the map of the field would correspond to the work area 70 and the headlands 80 in advance. The target path includes a plurality of parallel main paths P1 and a plurality of turning paths P2 interconnecting the plurality of main paths P1. The main paths P1 are located in the work area 70, whereas the turning paths P2 are located in the headlands 80. Broken lines in FIG. 7 depict the working breadth of the implement 300. The working breadth is previously set and recorded in the storage device 170. The working breadth may be set as the user manipulates the operational terminal 200, and recorded in the storage device 170. Alternatively, the working breadth may be automatically recognized when the implement 300 is connected to the work vehicle 100, and recorded to the storage device 170. The interval between the plurality of main paths P1 is matched to the working breadth. The target path, on the other hand, may be determined based on the user's manipulation, before auto-steer driving is begun.

Next, an example control performed by the controller 180 during automatic steering will be described.

Figure 8:
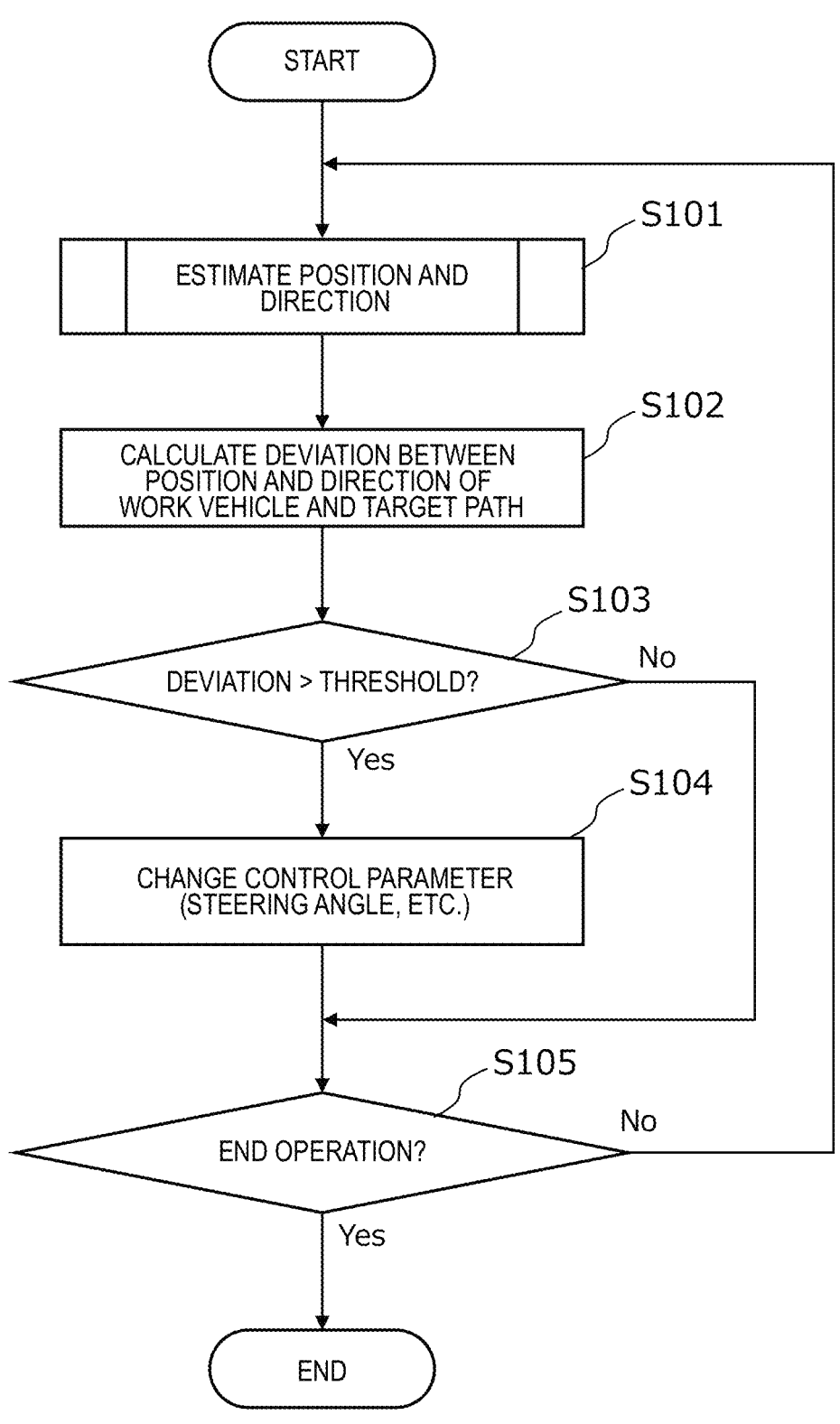
FIG. 8 is a flowchart showing an example operation to be performed by a controller during automatic steering.

FIG. 8 is a flowchart showing an example operation to be performed by the controller 180 during automatic steering. During travel of the work vehicle 100, the controller 180 performs auto-steer driving by performing the operation from steps S101 to S105 shown in FIG. 8. First, based on data that is output from the positioning system 120 and the inertial measurement system 125, the controller 180 estimates the position and direction of the work vehicle 100 (step S101). Details of the method of position and direction estimation will be described later. Next, the controller 180 calculates a deviation in each of the position and direction of the work vehicle 100 from the target path (step S102). A deviation in position represents a distance between the position of the work vehicle 100 at that moment and the target path. A deviation in direction represents the magnitude of the angle between the direction of the work vehicle 100 at that moment and the direction of the target path. The controller 180 determines whether or not the calculated deviation in position exceeds a threshold that is previously set, and whether or not the calculated deviation in direction exceeds another threshold that is previously set (step S103). When at least one of the deviation in position and the deviation in direction exceeds the respective threshold (s), the controller 180 changes a control parameter of a steering device included in the drive device 140 so that the deviation (s) decreases, thereby changing the steering angle. If the deviation in neither position nor direction exceeds the respective threshold at step S103, the operation of step S104 may be omitted. At the following step S105, the controller 180 determines whether a command to end operation has been received or not. The command to end operation may be given when the user has used the operational terminal 200 to instruct that the automatic steering mode be suspended, or when the work vehicle 100 has arrived at the destination, for example. If the command to end operation has not been issued, the control returns to step S101 and performs a similar operation based on a newly measured position of the work vehicle 100. The controller 180 repeats the operation from steps S101 to S105 until a command to end operation is given. The aforementioned operation is executed by the ECU 183 in the controller 180.

Hereinafter, with reference to FIGS. 9A to 9D, an example of steering control by the controller 180 will be described more specifically.

Figure 9A:
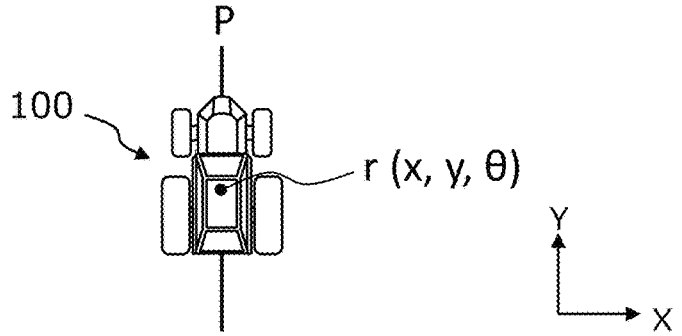
FIG. 9A is a diagram showing an example of a work vehicle that travels along a target path.
Figure 9B:
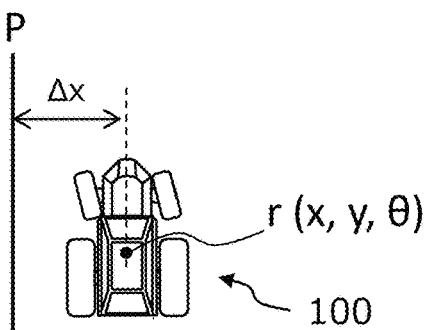
FIG. 9B is a diagram showing an example of a work vehicle at a position which is shifted rightward from the target path.
Figure 9C:
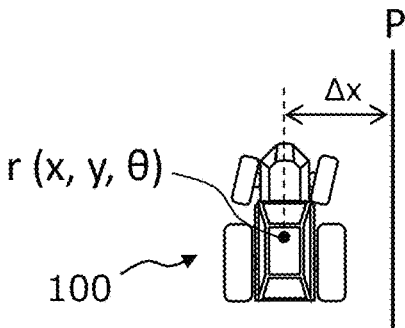
FIG. 9C is a diagram showing an example of a work vehicle at a position which is shifted leftward from the target path.
Figure 9D:
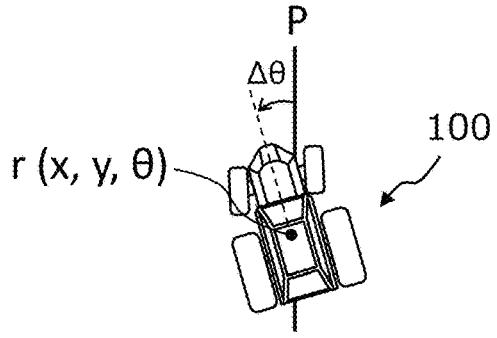
FIG. 9D is a diagram showing an example of a work vehicle which is oriented in an inclined direction with respect to the target path.

FIG. 9A is a diagram showing an example of a work vehicle 100 that travels along a target path P. FIG. 9B is a diagram showing an example of a work vehicle 100 at a position which is shifted rightward from the target path P. FIG. 9C is a diagram showing an example of a work vehicle 100 at a position which is shifted leftward from the target path P. FIG. 9D is a diagram showing an example of a work vehicle 100 which is oriented in an inclined direction with respect to the target path P. In these figures, the pose, i.e., the position and orientation, of the work vehicle 100 as estimated based on the signals that are output from the positioning system 120 and the inertial measurement system 125 is expressed as r (x, y, θ). Herein, (x, y) are coordinates representing the position of a reference point on the work vehicle 100, in an XU coordinate system which is a two-dimensional coordinate system being fixed to the globe. In the examples shown in FIGS. 9A to 9D, the reference point on the work vehicle 100 is at a position on the cabin where a GNSS antenna is disposed, but the reference point may be at any arbitrary position. θ is an angle representing the measured orientation of the work vehicle 100. Although the target path P is shown parallel to the Y axis in the examples illustrated in these figures, generally speaking, the target path P may not necessarily be parallel to the Y axis.

As shown in FIG. 9A, in the case where the position and orientation of the work vehicle 100 are not deviated from the target path P, the controller 180 maintains the steering angle and speed of the work vehicle 100 without changing them.

As shown in FIG. 9B, when the position of the work vehicle 100 is shifted rightward from the target path P, the controller 180 changes the steering angle by changing the angle of rotation of the steering wheel included in the drive device 140 so that the traveling direction of the work vehicle 100 will be inclined leftward, thus bringing the work vehicle 100 closer to the path P. Herein, not only the steering angle but also the speed may be changed. The magnitude of the steering angle may be adjusted in accordance with the magnitude of a positional deviation Δx, for example.

As shown in FIG. 9C, when the position of the work vehicle 100 is shifted leftward from the target path P, the controller 180 changes the steering angle by changing the angle of rotation of the steering wheel so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation Δx, for example.

As shown in FIG. 9D, in the case where the position of the work vehicle 100 is not considerably deviated from the target path P but its orientation is nonetheless different from the direction of the target path P, the controller 180 changes the steering angle so that the directional deviation Δθ will become smaller. In this case, too, not only the steering angle but also the speed may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order for the work vehicle 100 to return to the path P, so that the directional deviation Δθ will inevitably have a large absolute value. Conversely, when the positional deviation Δx has a small absolute value, the directional deviation 40 needs to become closer to zero. Therefore, it may be advantageous to introduce a relatively large weight (i.e., control gain) for the directional deviation 40 in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 during travel, the controller 180 halts the work vehicle 100, or switches from the automatic steering mode to the manual steering mode. Alternatively, when an obstacle is detected, the controller 180 may control the drive device 140 so as to avoid the obstacle.

Next, a dead reckoning operation to be performed when the reception intensity of GNSS signals decreases in the automatic steering mode will be described.

Figure 10:
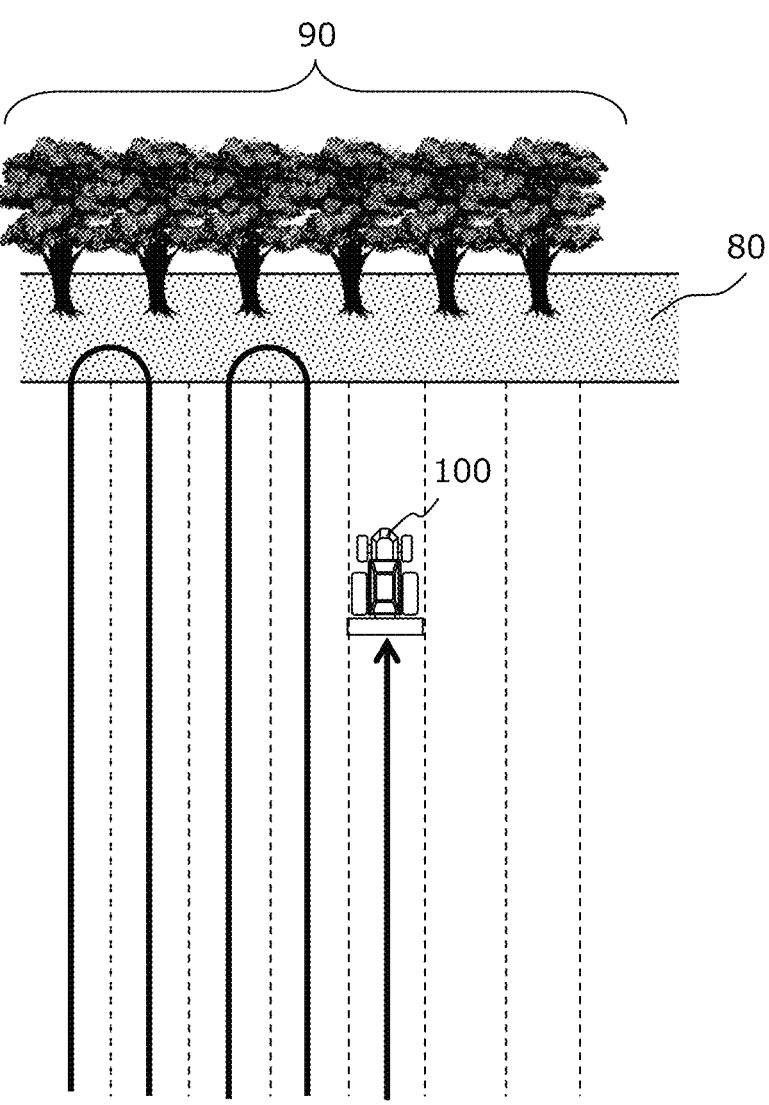
FIG. 10 is a diagram showing an example situation where the reception intensity of GNSS signals decreases.

An environment traveled by the work vehicle 100 may include obstacles which hinder reception of GNSS signals. For example, as shown in FIG. 10, trees 90 (e.g., shelter woods) may be planted in a headland 80 of the field. When the work vehicle 100 approaches such trees 90, the reception intensity of GNSS signals may lower, thereby reducing reliability of positioning. This means that the reliability of positioning based on GNSS signals will frequently decrease if the work vehicle 100 travels in an environment where a multitude of trees grow (e.g., an orchard or woods), thereby detracting from the stability of auto-steer driving.

Therefore, in a state where the reception intensity of GNSS signals decreases, the controller 180 in the present example embodiment performs a dead reckoning operation of estimating the position and direction of the work vehicle 100 based only on a signal that is output from the inertial measurement system 125.

Figure 11:
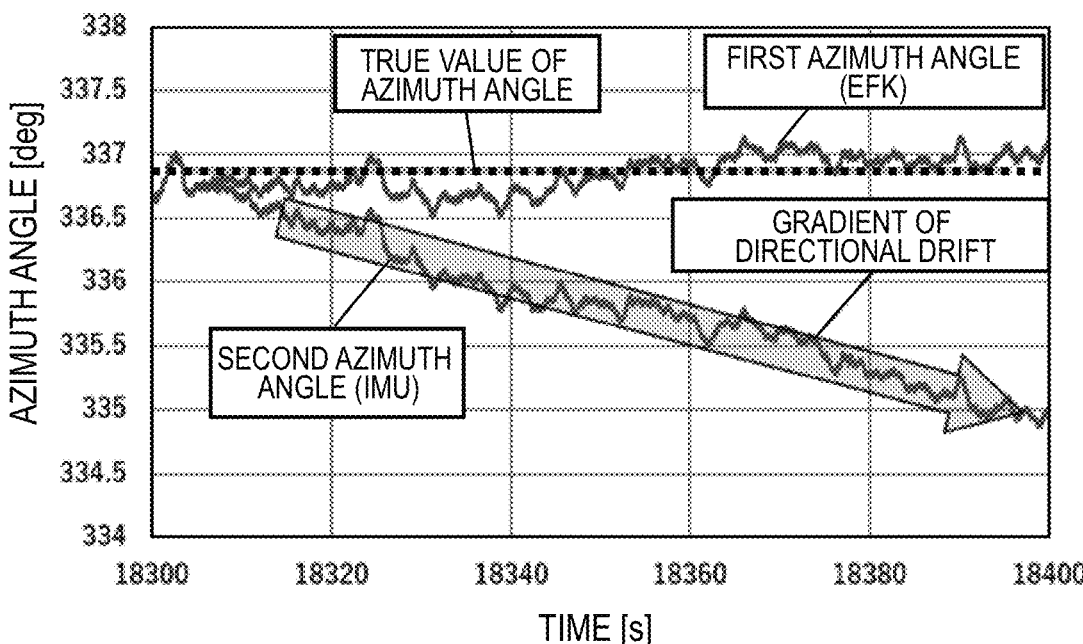
FIG. 11 is a graph showing examples of temporal change of the azimuth angle.

During dead reckoning, as described above, estimation errors of the azimuth angle (yaw angle) accumulate with lapse of time, thereby reducing the reliability of localization. FIG. 11 is a graph showing examples of temporal change of the azimuth angle. FIG. 11 shows an example temporal change of each of: a first azimuth angle that is estimated by a process utilizing an extended Kalman filter (EFK) based on GNSS signals and signals from the IMU in a state where GNSS signals can be normally received, and a second azimuth angle that is estimated based on signals from the IMU. As shown in FIG. 11, as compared to the first azimuth angle, the second azimuth angle suffers an increasing discrepancy from its true value (drift) with lapse of time.

Therefore, during dead reckoning, correction of the second azimuth angle is needed in order to suppress this directional drift.

In order to solve this problem, the controller 180 in the present example embodiment performs not only an operation of consecutively estimating the position and first azimuth angle of the work vehicle 100 based on the first chronological data that is output from the positioning system 120 and second chronological data that is output from the inertial measurement system 125 in a state where GNSS signals can be normally received (first state), but also an operation of consecutively estimating the second azimuth angle based on the second chronological data. Based on the consecutively-estimated first azimuth angle and second azimuth angle, the controller 180 calculates a rate of change in azimuth error. The rate of change in azimuth error is a value representing the rate of temporal change in the second azimuth angle, and corresponds to the gradient of the directional drift shown in FIG. 11. In a second state where the reception intensity of GNSS signals has decreased, the controller 180 corrects a second azimuth angle that is estimated based on the second chronological data, based on the aforementioned rate of change in azimuth error. Then, based on the corrected second azimuth angle, the controller 180 performs steering control for the work vehicle 100. This allows for suppressing the directional drift in the second state and improving the performance of automatic steering.

Figure 12:
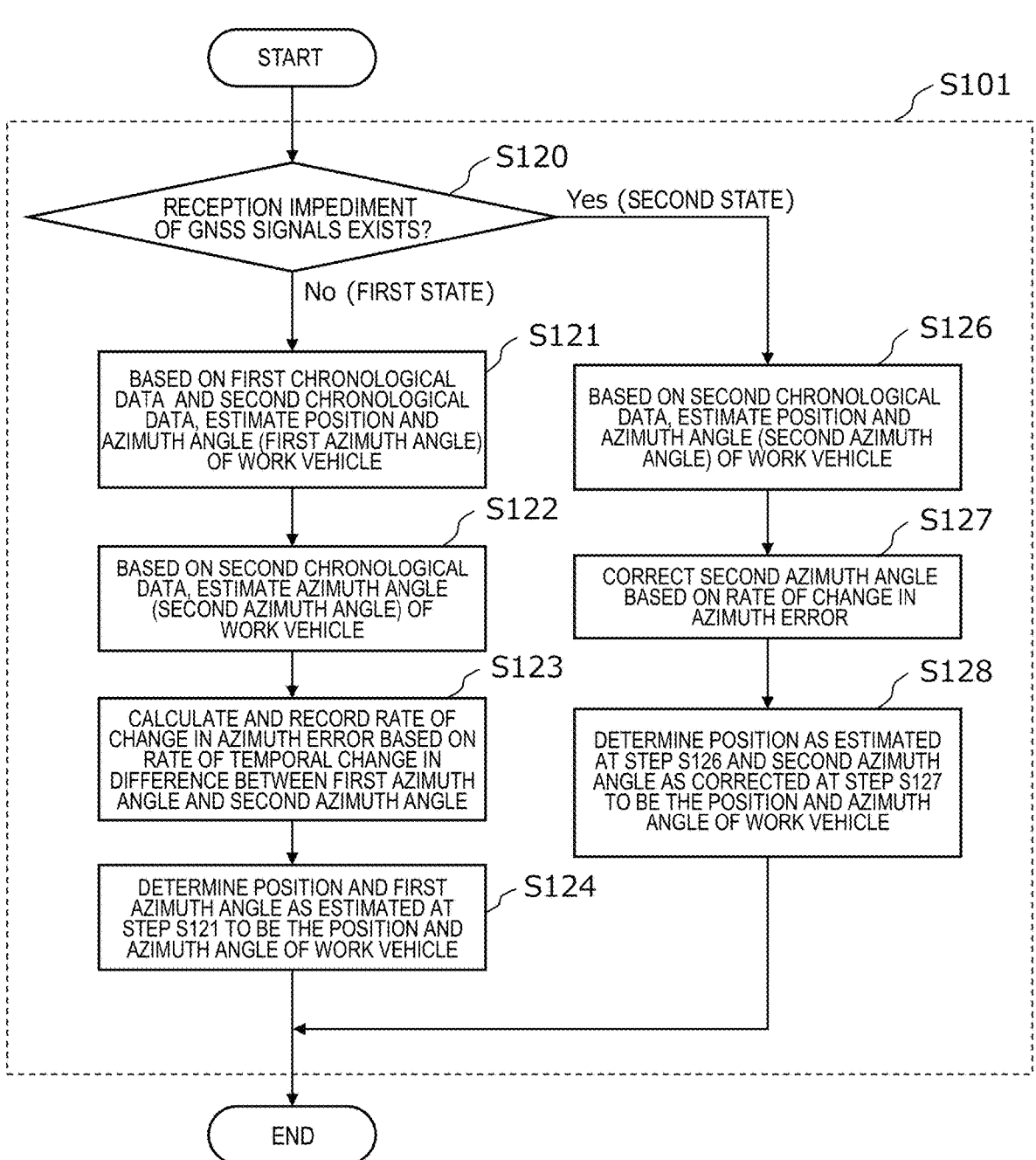
FIG. 12 is a flowchart showing an exemplary operation of position and direction estimation.

FIG. 12 is a flowchart showing an exemplary operation of position and direction estimation to be performed by the controller 180. The operation shown in FIG. 12 may be performed at step S101 in FIG. 8. The operation shown in FIG. 12 is performed by the ECU 183 in the controller 180. Hereinafter, the operation of each step will be described.

At step S120, the controller 180 determines whether a reception impediment of GNSS signals has occurred or not. A "reception impediment of GNSS signals" means a state where reception of GNSS signals (satellite signals) has deteriorated so much that the satellite reliability of positioning is lower than in a normal state. A reception impediment may occur when the number of detected satellites is small (e.g., three or fewer), when each satellite signal has a low reception intensity, or when multipath has occurred, for example. The controller 180 is able to determine whether a reception impediment exists or not based on information concerning the satellites which is included in the GNSS data that is output from the GNSS receiver 121 in the positioning system 120. For example, the presence or absence of a reception impediment can be determined based on: the reception intensity value for each satellite included in the GNSS data, a value of DOP (Dilution of Precision), which indicates how the satellites are being deployed, and so on.

Figure 13A:
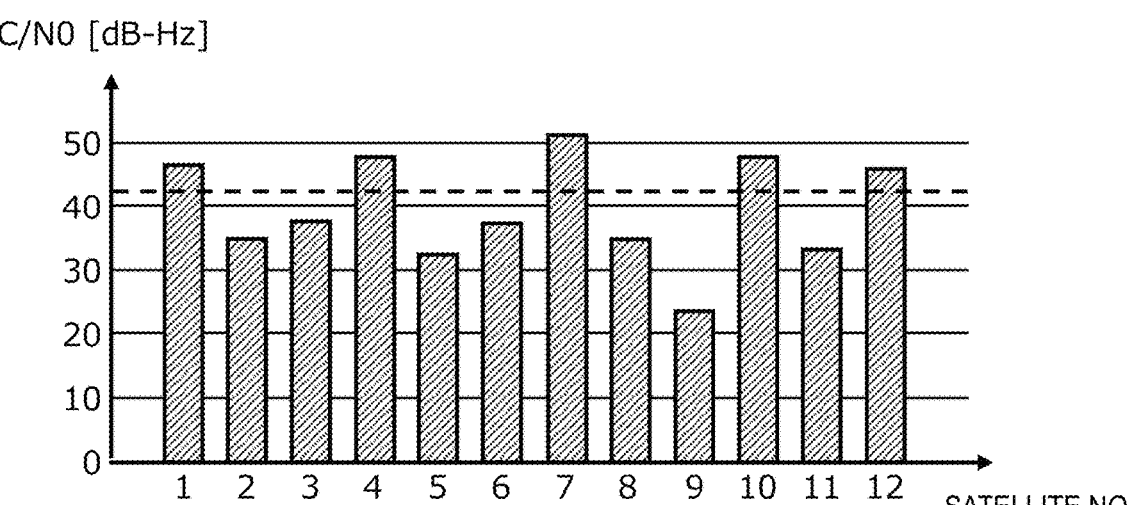
FIG. 13A shows an example of reception intensities of GNSS signals in the absence of a reception impediment.
Figure 13B:
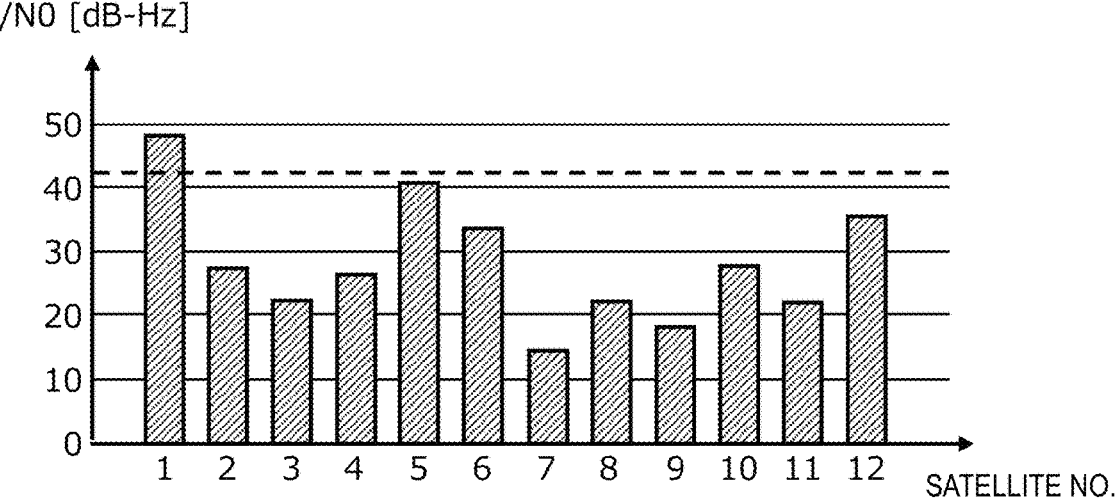
FIG. 13B shows an example of reception intensities of GNSS signals in the presence of a reception impediment.

FIGS. 13A and 13B are diagrams for describing example methods of determining the presence or absence of a reception impediment based on values of reception intensity of GNSS signals. FIG. 13A shows an example of reception intensities of GNSS signals in the absence of a reception impediment. FIG. 13B shows an example of reception intensities of GNSS signals in the presence of a reception impediment. In this example, GNSS signals from 12 satellites are received, and the reception intensity is expressed in C/N0 values. This is only an example, and the number of satellites from which GNSS signals are available and the manner of expressing reception intensity depend on the system. For example, the controller 180 can determine the presence or absence of a reception impediment based on whether or not the number of satellites whose reception intensity is above a reference value that is previously set is equal to or greater than a threshold (e.g., 4). In FIGS. 13A and 13B, an example of a reference value for reception intensity is indicated by a broken line. In the case where the threshold is 4, in the example of FIG. 13A, the number of satellites whose reception intensity is above the reference value is 5, which is above the threshold; therefore the controller 180 can determine that no reception impediment exists in this case. On the other hand, in the example of FIG. 13B, the number of satellites whose reception intensity is above the reference value is 1, which is below the threshold. Therefore, the controller 180 can determine that a reception impediment exists. Note that such a method of determination is only an example. The controller 180 may determine the presence or absence of a reception impediment by any other method. For example, in the case where a value indicating the reliability level of positioning is output from the positioning system 120, the controller 180 may determine whether a reception impediment exists or not based on this reliability level value.

Thus, the first chronological data that is output from the positioning system 120 may include information indicating a reliability of positioning. The controller 180 may be configured or programmed to determine the reliability level of the first chronological data based on this information, and to distinguish between the first state and the second state based on the reliability level.

The controller 180 may change the threshold decrease in reliability level to determine the presence of a reception impediment in accordance with the user's setting. For example, the criterion for the reliability level determination may be changed in accordance with the required accuracy of work, as set by the user. The accuracy of work may be designated according to the method of positioning used, e.g., RTK (high), DGPS (middle), point positioning (low).

At step S120, if the controller 180 determines that no reception impediment of GNSS signals exists (No), control proceeds to step S121. This state corresponds to the aforementioned "first state". If the controller 180 determines that a reception impediment of GNSS signals exists (Yes), control proceeds to step S126. This state corresponds to the aforementioned "second state".

At step S121, based on the first chronological data that is output from the positioning system 120 and the second chronological data that is output from the inertial measurement system 125, the controller 180 estimates the position and azimuth angle (first azimuth angle) of the work vehicle 100. An estimation algorithm utilizing an extended Kalman filter may be used for this estimation, for example. Without being limited to an extended Kalman filter, the estimation of the position and azimuth angle can be performed by any arbitrary estimation algorithm.

At step S122, based on the second chronological data, the controller 180 estimates the azimuth angle (second azimuth angle) of the work vehicle 100. The estimation of the second azimuth angle may be performed by a process such as integrating the measurement values from the angular velocity included in the second chronological data over time, for example. The process of the step S122 may be performed before or at the same time as step S121.

At step S123, the controller 180 calculates a rate of change in azimuth error, based on a rate of temporal change in difference between the first azimuth angle and the second azimuth angle. Details of the method for calculating the rate of change in azimuth error will be described later. The controller 180 causes the calculated rate of change in azimuth error to be stored to the storage device 170.

At step S124, the controller 180 determines the position and first azimuth angle as estimated at step S121 to be the position and azimuth angle of the work vehicle 100. Based on the determined position and azimuth angle of the work vehicle 100, the controller 180 performs the steering control at step S102 as well as the processes of subsequent steps in FIG. 8.

The processes from steps S121 to S124 are repeatedly performed in the first state where no reception impediment of GNSS signals exists. Once a reception impediment of GNSS signals occurs, the processes from steps S126 to S128 are performed.

At step S126, based on the second chronological data that is output from the inertial measurement system 125, the controller 180 estimates the position and azimuth angle (second azimuth angle) of the work vehicle 100. Against the estimated values of position and azimuth angle from immediately before the occurrence of a reception impediment of GNSS signals, the controller 180 determines estimated values of the position and second azimuth angle of the work vehicle 100 through a process of integrating measurement values subsequently obtained from the acceleration sensor 126 and the angular velocity sensor 127, for example.

At step S127, based on the rate of change in azimuth error as calculated at step S123, the controller 180 corrects the second azimuth angle. Specifically, the controller 180 may determine a corrected value of the second azimuth angle by subtracting, from the second azimuth angle, a value that is obtained by multiplying the rate of change in azimuth error with the elapsed time (i.e., the cycle of the process of FIG. 12) from the moment of performing the previous instance of the directional estimation process. For example, the controller 180 may use a rate of change in azimuth error that was calculated immediately before, or use a rate of change in azimuth error that is based on data acquired in a period in which GNSS signals were most stably obtained.

At step S128, the controller 180 determines the position as estimated at step S126 and the second azimuth angle as corrected at step S128 to be the position and direction of the work vehicle 100. Based on the determined position and azimuth angle of the work vehicle 100, the controller 180 performs the steering control at step S102 as well as the processes of subsequent steps in FIG. 8.

Now, an example of the method for calculating the rate of change in azimuth error at step S123 will be described. Herein, it is assumed that an extended Kalman filter (EKF) process based on data that is output from the positioning system 120 and the inertial measurement system 125 (e.g., an IMU) is to be performed. A highly accurate first azimuth angle that is calculated through an EKF process is expressed as $\theta_1$, and a second azimuth angle that is calculated based only on data from the inertial measurement system 125 is expressed as $\theta_2$. In the first state where the reception intensity of GNSS signals is sufficiently high, the controller 180 can calculate a rate of change in azimuth error $\Delta\theta_{drift}$, which represents the gradient of a drift in azimuth angle, by dividing the difference between the first azimuth angle $\theta_1$ and the second azimuth angle $\theta_2$ by a unit time $\Delta t$. That is, by carrying out a computation expressed by eq. 1, the controller 180 is able to calculate the rate of change in azimuth error $\Delta\theta_{drift}$.

$$\Delta\theta_{drift} = (\theta_1 - \theta_2)/\Delta t \qquad \text{(eq. 1)}$$

Herein, the unit time Δt may be set to a value of e.g., about 0.1 seconds to about several seconds.

In practice, as shown in FIG. 11, the difference between the first azimuth angle $\theta_1$ and the second azimuth angle $\theta_2$ undergoes minute fluctuations with lapse of time. Therefore, the controller 180 may determine the rate of change in azimuth error to be a statistic (e.g., a mean value) of $\Delta\theta_{drift}$ as calculated according to eq. 1 over a predetermined duration. In other words, at a predetermined time interval, the controller 180 may repeatedly calculate a rate of temporal change in the difference between the first azimuth angle $\theta_1$ and the second azimuth angle $\theta_2$, and compute a statistic (e.g., a mean value) of rates of temporal change which have been calculated a plural number of times (e.g., not fewer than 3 times and not more than 10 times), as the rate of change in azimuth error. The predetermined time interval may be set to any arbitrary value, e.g., not less than about 1 second and not more than about 20 seconds.

Figure 14A:
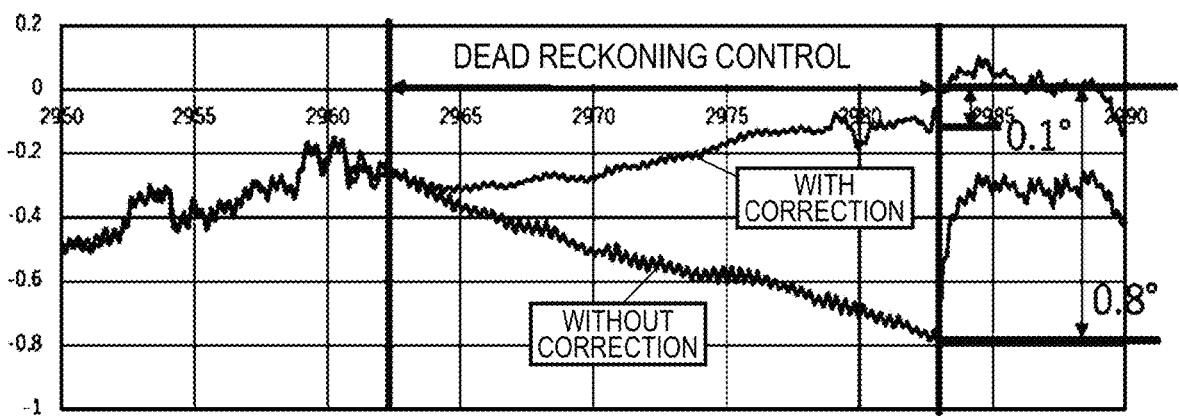
FIG. 14A is a diagram showing examples of temporal change in directional deviation in the case where a correction process is performed and in the case where the correction process is not performed, respectively.
Figure 14B:
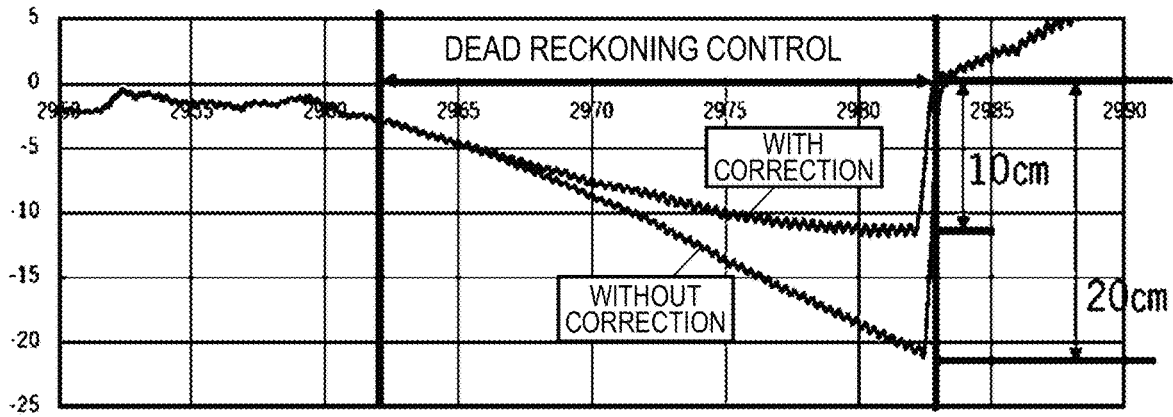
FIG. 14B is a diagram showing examples of temporal change in positional deviation in the case where a correction process is performed and in the case where the correction process is not performed, respectively.

FIGS. 14A and 14B are diagrams illustrating effects of the present example embodiment. FIG. 14A shows examples of temporal change in directional deviation in the case where the aforementioned correction is performed and in the case where the aforementioned correction is not performed, respectively. FIG. 14B shows examples of temporal change in positional deviation in the case where the aforementioned correction is performed and in the case where the aforementioned correction is not performed, respectively. Directional deviation represents a difference from the true value of the azimuth angle, and positional deviation represents a difference from the true value of the position coordinates. As is illustrated in these figures, it was confirmed that applying the correction process according to the present example embodiment greatly reduces deviations in position and direction.

As described above, during travel of the work vehicle 100, in a period (first state) where the first chronological data that is output from the positioning system 120 has high reliability, the controller 180 repeats the operation of calculating a rate of change in azimuth error and recording it to the storage device 170. Once in the second state associated with a low reliability of the first chronological data, which may be caused by loss of GNSS signals, etc., the controller 180 performs a dead reckoning operation of estimating the position and second direction based on the second chronological data that is output from the inertial measurement system 125. During the dead reckoning operation, the controller 180 corrects the second azimuth angle based on the rate of change in azimuth error that was calculated in the first state, and performs steering control based on the corrected second azimuth angle. Through such operation, influences of directional drifts can be reduced, whereby the reliability of localization during dead reckoning can be improved.

In the example of FIG. 12, the controller 180 calculates a rate of change in azimuth error in the first state where no reception impediment of GNSS signals exists. However, calculation of a rate of change in azimuth error may be performed in the second state where a reception impediment of GNSS signals exists. In that case, at step S123, instead of calculating a rate of change in azimuth error, the controller 180 may calculate a rate of temporal change in the difference between the first azimuth angle and the second azimuth angle, and record this rate of temporal change to the storage device 170 in association with time. Alternatively, the controller 180 may record the first azimuth angle and the second azimuth angle to the storage device 170 in association with time. With such recording, in the second state, the controller 180 is able to perform calculation of a rate of change in azimuth error based on the stored information.

Moreover, the controller 180 may be configured to perform in the second state a correction of the second azimuth angle based on the rate of change in azimuth error only if the duration of the first state is longer than a first length of time. The first length of time may be set to a value of, e.g., about 20 seconds or more. By utilizing rates of change in azimuth error that were acquired over such a relatively long period, the second azimuth angle in the second state can be corrected to satisfactory values. This also serves to, in the case where a sufficient traveling time is not available in a circumstance that provides good GNSS positioning accuracy, prevent poorly-reliable rates of change in azimuth error from being used to correct the azimuth angle to an improper value.

The process shown in FIG. 12 may be performed not only while the work vehicle 100 is traveling straight via automatic steering but also while the work vehicle 100 is traveling along a curved path or turn in an headland. Since the trend of directional drift does not differ between when traveling straight and when turning, rates of change in azimuth error based on data acquired when traveling straight and rates of change in azimuth error based on data acquired when turning can be used without distinction. For example, rates of change in azimuth error based on data acquired when turning may be utilized at the moment of losing GNSS signals when traveling straight or when turning, in order to correct the azimuth angle.

The controller 180 may output an alert when the first state transitions to the second state. For example, when detecting a transition from the first state to the second state, the controller 180 may cause a display device of the operational terminal 200 to indicate an alert, or cause the buzzer 220 to generate an alarm sound. Moreover, if the second state continues for a second length of time or longer, the controller 180 may suspend automatic steering and output an alert to the operational terminal 200 or the buzzer 220. The second length of time may be set to any arbitrary value, e.g., not less than about 10 seconds and not more than about 30 seconds.

Figure 15:
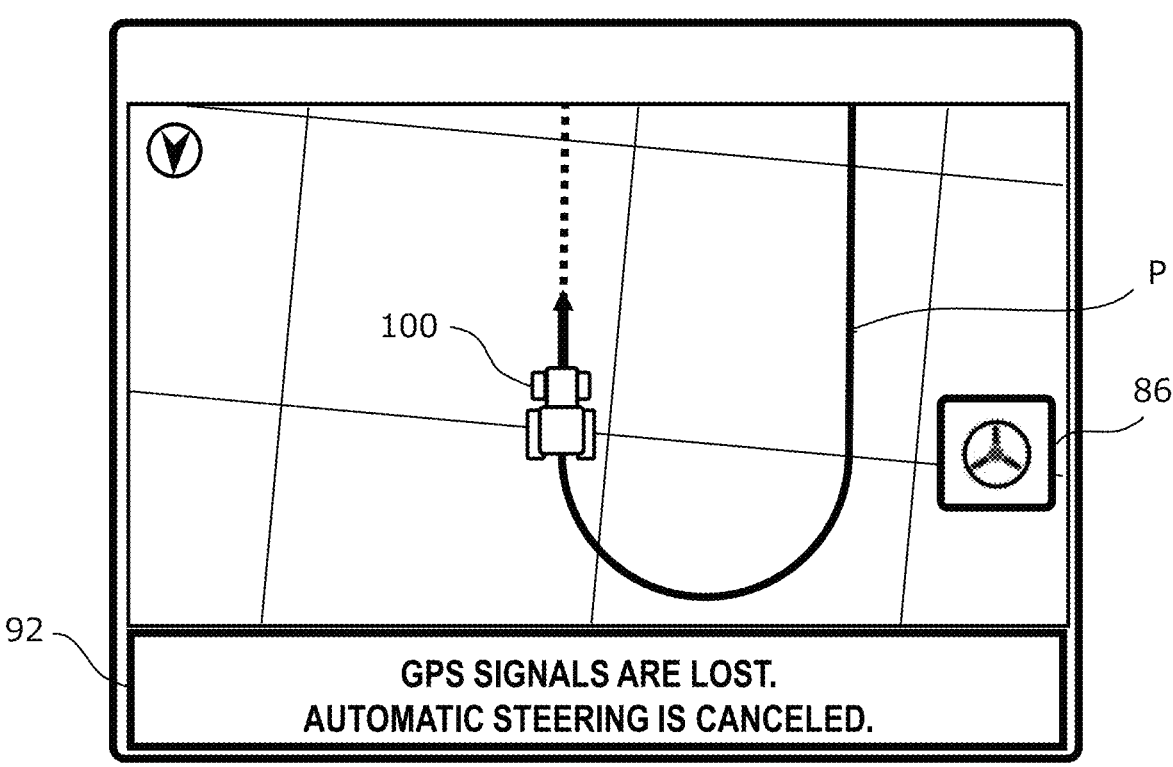
FIG. 15 is a diagram showing an example indication on the operational terminal.

FIG. 15 is a diagram showing an example indication on the operational terminal 200. In this example, the controller 180 causes the display of the operational terminal 200 to display a map of a field that includes the work vehicle 100 and the target path P. In the example of FIG. 15, an icon 86 indicating ON/OFF of the automatic steering mode and an alert message 92 are being displayed. For example, if a state where the reception intensity of GNSS signals (e.g., GPS signals) remains below a reference level continues for a predetermined duration or longer, the controller 180 may cancel automatic steering, and change the color of the icon 86 from green to gray, for example. Moreover, as shown in FIG. 15, the alert message 92 such as "GPS SIGNALS ARE LOST. AUTOMATIC STEERING IS CANCELED." may be indicated on the operational terminal 200. In addition to such an alert indication, the controller 180 may cause the buzzer 220 to generate an alarm sound. By outputting such an alert, the user can be effectively notified that automatic steering has been canceled.

In the above example embodiment, the positioning system 120 includes the GNSS receiver 121. Alternatively, an external sensor (s) such as a LiDAR sensor (s) or image sensor (s) may be included. When the reliability of localization based on such external sensors has decreased, a dead reckoning that involves the above-described correction process may be performed. In that case, too, the reliability of localization based on dead reckoning can be improved.

The correction process according to the present example embodiment is applicable to not only auto-steer driving, but also to self-driving where both steering and traveling speed are automatically controlled.

In the above example embodiments, the work vehicle 100 may be an unmanned work vehicle which performs self-driving. In that case, component elements which are only required for human driving, e.g., the cabin, the driver's seat, the steering wheel, and the operational terminal, do not need to be provided in the work vehicle 100. The unmanned work vehicle may perform a similar operation to the operation according to any of the above example embodiments via autonomous driving, or by remote manipulations by a user.

A control system that provides the various functions according to the above example embodiments can be mounted to an work vehicle lacking such functions as an add-on. Such a control system may be manufactured and sold independently from the work vehicle. A computer program for use in such a control system may also be manufactured and sold independently from the work vehicle. The computer program may be provided in a form stored in a computer-readable, non-transitory storage medium, for example. The computer program may also be provided through downloading via telecommunication lines (e.g., the Internet).

Thus, example embodiments of the present disclosure encompass work vehicles, control systems, and control methods as exemplified in the following Items.

Item 1

A work vehicle that performs auto-steer driving includes a positioning system to output first chronological data including positional information of the work vehicle, an inertial measurement system, including an acceleration sensor and an angular velocity sensor, to output second chronological data based on measurement values from the acceleration sensor and measurement values from the angular velocity sensor, and a controller configured or programmed to estimate a position and an azimuth angle of the work vehicle based on the first chronological data and the second chronological data, and to perform steering control for the work vehicle based on the estimated position and azimuth angle and on a target path that is previously set, wherein the controller is configured or programmed to, in a first state where positioning by the positioning system is possible, consecutively estimate a first azimuth angle of the work vehicle based on the first chronological data and the second chronological data, consecutively estimate a second azimuth angle of the work vehicle based on the second chronological data, and to perform steering control for the work vehicle based on the first azimuth angle, calculate a rate of change in azimuth error of the second azimuth angle based on a difference between the consecutively-estimated first azimuth angle and the consecutively-estimated second azimuth angle in the first state, and when the first state transitions to a second state that is associated with a decreased reliability of positioning by the positioning system, perform steering control for the work vehicle until returning to the first state, based on an azimuth angle that is a result of causing the second azimuth angle as estimated based on the second chronological data to be corrected based on the rate of change in azimuth error.

Item 2

The work vehicle of Item 1, wherein, in the first state, the controller is configured or programmed to use a process utilizing an extended Kalman filter to estimate the position and first azimuth angle of the work vehicle from the first chronological data and the second chronological data.

Item 3

The work vehicle of Item 1 or 2, wherein the controller is configured or programmed to calculate the rate of change in azimuth error based on a rate of temporal change in difference between the first azimuth angle and the second azimuth angle in the first state.

Item 4

The work vehicle of Item 3, wherein at a predetermined time interval the controller is configured or programmed to repeatedly calculate the rate of temporal change in difference between the first azimuth angle and the second azimuth angle in the first state, and compute as the rate of change in azimuth error a statistic of rates of temporal change which have been calculated a plural number of times.

Item 5

The work vehicle of Item 4, wherein the predetermined time interval is not less than about 1 second and not more than about 20 seconds.

Item 6

The work vehicle of Item 4, wherein the plural number of times is not fewer than 3 times and not more than 10 times.

Item 7

The work vehicle of any of Items 1 to 6, wherein the controller is configured or programmed to perform in the second state a correction of the second azimuth angle based on the rate of change in azimuth error only if a duration of the first state is longer than a first length of time.

Item 8

The work vehicle of any of Items 1 to 7, wherein the controller is configured or programmed to output an alert when the first state transitions to the second state.

Item 9

The work vehicle of any of Items 1 to 8, wherein if the second state continues for a second length of time or longer, the controller is configured or programmed to suspend automatic steering and output an alert.

Item 10

The work vehicle of Item 9, wherein the second length of time is not less than about 10 seconds and not more than about 30 seconds.

Item 11

The work vehicle of any of Items 1 to 10, wherein the positioning system includes a GNSS receiver.

Item 12

The work vehicle of Item 11, wherein, the first chronological data includes information indicating a reliability of positioning, and the controller is configured or programmed to determine the reliability level of the first chronological data based on the information, and distinguish between the first state and the second state based on the reliability level.

Item 13

A control system for a work vehicle that performs auto-steer driving, the work vehicle including a positioning system to output first chronological data including positional information of the work vehicle, and an inertial measurement system, including an acceleration sensor and an angular velocity sensor, to output second chronological data based on measurement values from the acceleration sensor and measurement values from the angular velocity sensor, the control system including a controller configured or programmed to estimate a position and an azimuth angle of the work vehicle based on the first chronological data and the second chronological data, and to perform steering control for the work vehicle based on the estimated position and azimuth angle and on a target path that is previously set, wherein the controller is configured or programmed to, in a first state where positioning by the positioning system is possible, consecutively estimate a first azimuth angle of the work vehicle based on the first chronological data and the second chronological data, consecutively estimate a second azimuth angle of the work vehicle based on the second chronological data, and to perform steering control for the work vehicle based on the first azimuth angle, calculate a rate of change in azimuth error of the second azimuth angle based on a difference between the consecutively-estimated first azimuth angle and the consecutively-estimated second azimuth angle in the first state, and when the first state transitions to a second state that is associated with a decreased reliability of positioning by the positioning system, perform steering control for the work vehicle until returning to the first state, based on an azimuth angle that is a result of causing the second azimuth angle as estimated based on the second chronological data to be corrected based on the rate of change in azimuth error.

Item 14

A method for controlling a work vehicle that performs auto-steer driving, the work vehicle including a positioning system to output first chronological data including positional information of the work vehicle, and an inertial measurement system, including an acceleration sensor and an angular velocity sensor, to output second chronological data based on measurement values from the acceleration sensor and measurement values from the angular velocity sensor, the method including, in a first state where positioning by the positioning system is possible, consecutively estimating a first azimuth angle of the work vehicle based on the first chronological data and the second chronological data, consecutively estimating a second azimuth angle of the work vehicle based on the second chronological data, and performing steering control for the work vehicle based on the first azimuth angle, calculating a rate of change in azimuth error of the second azimuth angle based on a difference between the consecutively-estimated first azimuth angle and the consecutively-estimated second azimuth angle in the first state, and when the first state transitions to a second state that is associated with a decreased reliability of positioning by the positioning system, performing steering control for the work vehicle until returning to the first state, based on an azimuth angle that is a result of causing the second azimuth angle as estimated based on the second chronological data to be corrected based on the rate of change in azimuth error.

The techniques according to example embodiments of the present disclosure are applicable to work vehicles for use in agricultural applications, e.g., tractors, transplanters, or harvesters. The techniques according to example embodiments of the present disclosure are also applicable to work vehicles for use in non-agricultural applications, e.g., construction vehicles or snowplow vehicles.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle that performs auto-steer driving, comprising:

a positioning system to output first chronological data including positional information of the work vehicle;

an inertial measurement system, including an acceleration sensor and an angular velocity sensor, to output second chronological data based on measurement values from the acceleration sensor and measurement values from the angular velocity sensor; and a controller configured or programmed to estimate a position and an azimuth angle of the work vehicle based on the first chronological data and the second chronological data, and to perform steering control for the work vehicle based on the estimated position and azimuth angle and on a target path that is previously set; wherein the controller is configured or programmed to:

in a first state where positioning by the positioning system is possible, consecutively estimate a first azimuth angle of the work vehicle based on the first chronological data and the second chronological data, consecutively estimate a second azimuth angle of the work vehicle based on the second chronological data, and to perform steering control for the work vehicle based on the first azimuth angle;

calculate a rate of change in azimuth error of the second azimuth angle based on a rate of temporal change in a difference between the consecutively-estimated first azimuth angle and the consecutively-estimated second azimuth angle in the first state; and when the first state transitions to a second state that is associated with a decreased reliability of positioning by the positioning system, perform steering control for the work vehicle until returning to the first state, based on an azimuth angle that is a result of causing the second azimuth angle as estimated based on the second chronological data to be corrected based on the rate of change in azimuth error.

2. The work vehicle of claim 1, wherein, in the first state, the controller is configured or programmed to use a process utilizing an extended Kalman filter to estimate the position and the first azimuth angle of the work vehicle from the first chronological data and the second chronological data.

3. The work vehicle of claim 1, wherein at a predetermined time interval, the controller is configured or programmed to repeatedly calculate the rate of temporal change in difference between the first azimuth angle and the second azimuth angle in the first state, and compute as the rate of change in azimuth error a statistic of rates of temporal change which have been calculated a plural number of times.

4. The work vehicle of claim 3, wherein the predetermined time interval is not less than about 1 second and not more than about 20 seconds.

5. The work vehicle of claim 3, wherein the plural number of times is not fewer than 3 times and not more than 10 times.

6. The work vehicle of claim 1, wherein the controller is configured or programmed to perform in the second state a correction of the second azimuth angle based on the rate of change in azimuth error only if a duration of the first state is longer than a first length of time.

7. The work vehicle of claim 1, wherein the controller is configured or programmed to output an alert when the first state transitions to the second state.

8. The work vehicle of claim 1, wherein if the second state continues for a second length of time or longer, the controller is configured or programmed to suspend automatic steering and output an alert.

9. The work vehicle of claim 8, wherein the second length of time is not less than about 10 seconds and not more than about 30 seconds.

10. The work vehicle of claim 1, wherein the positioning system includes a GNSS receiver.

11. The work vehicle of claim 10, wherein the first chronological data includes information indicating a reliability of positioning; and the controller is configured or programmed to determine the reliability level of the first chronological data based on the information, and distinguish between the first state and the second state based on the reliability level.

12. A control system for a work vehicle that performs auto-steer driving, the work vehicle including a positioning system to output first chronological data including positional information of the work vehicle, and an inertial measurement system, including an acceleration sensor and an angular velocity sensor, to output second chronological data based on measurement values from the acceleration sensor and measurement values from the angular velocity sensor, the control system comprising:

a controller configured or programmed to estimate a position and an azimuth angle of the work vehicle based on the first chronological data and the second chronological data, and to perform steering control for the work vehicle based on the estimated position and azimuth angle and on a target path that is previously set; wherein the controller is configured or programmed to:

in a first state where positioning by the positioning system is possible, consecutively estimate a first azimuth angle of the work vehicle based on the first chronological data and the second chronological data, consecutively estimate a second azimuth angle of the work vehicle based on the second chronological data, and perform steering control for the work vehicle based on the first azimuth angle;

calculate a rate of change in azimuth error of the second azimuth angle based on a rate of temporal change in a difference between the consecutively-estimated first azimuth angle and the consecutively-estimated second azimuth angle in the first state; and when the first state transitions to a second state that is associated with a decreased reliability of positioning by the positioning system, perform steering control for the work vehicle until returning to the first state, based on an azimuth angle that is a result of causing the second azimuth angle as estimated based on the second chronological data to be corrected based on the rate of change in azimuth error.

13. A method for controlling a work vehicle that performs auto-steer driving, the work vehicle including a positioning system to output first chronological data including positional information of the work vehicle, and an inertial measurement system, including an acceleration sensor and an angular velocity sensor, to output second chronological data based on measurement values from the acceleration sensor and measurement values from the angular velocity sensor, the method comprising:

in a first state where positioning by the positioning system is possible, consecutively estimating a first azimuth angle of the work vehicle based on the first chronological data and the second chronological data, consecutively estimating a second azimuth angle of the work vehicle based on the second chronological data, and performing steering control for the work vehicle based on the first azimuth angle;

calculating a rate of change in azimuth error of the second azimuth angle based on a rate of temporal change in a difference between the consecutively-estimated first azimuth angle and the consecutively-estimated second azimuth angle in the first state; and when the first state transitions to a second state that is associated with a decreased reliability of positioning by the positioning system, performing steering control for the work vehicle until returning to the first state, based on an azimuth angle that is a result of causing the second azimuth angle as estimated based on the second chronological data to be corrected based on the rate of change in azimuth error.

\* \* \* \* \*